United States Patent
Ly et al.

(10) Patent No.: US 10,506,534 B2
(45) Date of Patent: Dec. 10, 2019

(54) SYNCHRONIZATION AND DATA CHANNEL NUMEROLOGY IN WIRELESS COMMUNICATIONS

(71) Applicant: QUALCOMM Incorporated, San Diego, CA (US)

(72) Inventors: Hung Ly, San Diego, CA (US); Wanshi Chen, San Diego, CA (US); Jing Sun, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 15/729,153

(22) Filed: Oct. 10, 2017

(65) Prior Publication Data

US 2018/0110019 A1     Apr. 19, 2018

Related U.S. Application Data

(60) Provisional application No. 62/408,509, filed on Oct. 14, 2016.

(51) Int. Cl.
*H04W 56/00* (2009.01)
*H04L 27/26* (2006.01)

(52) U.S. Cl.
CPC ....... *H04W 56/001* (2013.01); *H04L 27/2613* (2013.01); *H04L 27/2692* (2013.01)

(58) Field of Classification Search
CPC .. H04B 1/7073; H04B 1/7087; H04B 1/7156; H04B 1/7183; H04B 7/18589; H04B 7/19; H04B 2201/7073; H04B 7/2125; H04H 60/50; H04J 3/06; H04J 3/0602;

(Continued)

(56) References Cited

U.S. PATENT DOCUMENTS

| | | | |
|---|---|---|---|
| 2017/0201968 A1* | 7/2017 | Nam | H04W 4/70 |
| 2017/0245165 A1* | 8/2017 | Onggosanusi | H04L 5/0048 |
| 2017/0311276 A1* | 10/2017 | Tsai | H04B 7/0617 |

(Continued)

FOREIGN PATENT DOCUMENTS

WO    WO-2009084931 A1    7/2009

OTHER PUBLICATIONS

Eeva et al., "Achieving Low Latency and Energy Consumption by 5G TDD Mode Optimization," 2014 IEEE International Conference on Communications Workshops (ICC), Jun. 10, 2014, 6 pgs., XP032630839, DOI: 10.1109/ICCW.2014.6881163 [retrieved on Aug. 20, 2014], Institute of Electrical and Electronics Engineers.

(Continued)

*Primary Examiner* — Robert J Lopata
(74) *Attorney, Agent, or Firm* — Holland & Hart LLP

(57) ABSTRACT

A base station may configure at least a first downlink transmission in a regular downlink burst with the first numerology for transmitting at least a portion of a data channel to a UE according to a numerology of a service used for data channel transmission. The base station also may configure at least a portion of a second downlink transmission in a regular downlink burst with a second numerology for transmitting a synchronization signal to the UE. A UE that receives the downlink regular burst may demodulate and decode the symbols in the received transmissions according to the numerology associated with each symbol.

30 Claims, 22 Drawing Sheets

(58) Field of Classification Search
CPC ...... H04J 3/0605; H04J 3/0614; H04J 3/0617; H04L 27/2613; H04L 27/2692; H04W 56/001
USPC ......................................................... 370/350
See application file for complete search history.

(56) References Cited

U.S. PATENT DOCUMENTS

| | | | |
|---|---|---|---|
| 2017/0311315 A1 | 10/2017 | Islam et al. | |
| 2018/0049047 A1* | 2/2018 | Lin | H04W 24/02 |
| 2018/0077710 A1* | 3/2018 | Ly | H04W 72/0453 |
| 2018/0098361 A1* | 4/2018 | Ji | H04L 45/00 |
| 2018/0249400 A1* | 8/2018 | Harada | H04W 48/16 |
| 2019/0029003 A1* | 1/2019 | Takeda | H04W 4/06 |
| 2019/0075006 A1* | 3/2019 | Yi | H04L 27/2607 |

OTHER PUBLICATIONS

ISA/EP, International Search Report and Written Opinion of the International Searching Authority, Int'l Application No. PCT/US2017/056180, dated Jan. 16, 2018, European Patent Office, Rijswijk, NL, 14 pgs.

\* cited by examiner

Synchronization Signal Numerology

Nominal Numerology

Synchronization Signal Numerology

Nominal Numerology

Synchronization Signal Numerology

Nominal Numerology

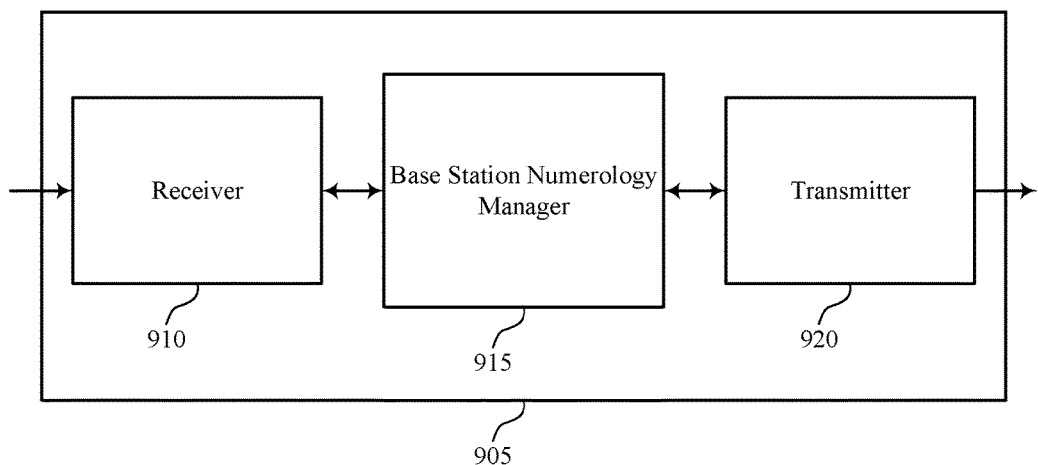
FIG. 9
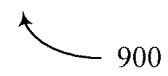

SYNCHRONIZATION AND DATA CHANNEL NUMEROLOGY IN WIRELESS COMMUNICATIONS

CROSS REFERENCES

The present Application for Patent claims priority to U.S. Provisional Patent Application No. 62/408,509 by LY, et al., entitled "Synchronization And Data Channel Numerology In Wireless Communications," filed Oct. 14, 2016, assigned to the assignee hereof, and which is hereby expressly incorporated by reference herein in its entirety.

INTRODUCTION

The following relates generally to wireless communication, and more specifically to synchronization and data channel numerology in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB). A base station may communicate with a set of UEs on downlink (DL) channels (e.g., for transmissions from a base station to a UE) and uplink (UL) channels (e.g., for transmissions from a UE to a base station).

As communication providers continue to increase the capacity of wireless networks, and as demand for such capacity grows, efficient use of wireless resources becomes increasingly relevant for high quality and relatively low cost wireless communications. One technique used to enhance the efficiency of wireless networks is providing various different services that may have different throughput and latency requirements. Base stations and UEs may also have various different synchronization and control communications that may be independent of the services provided to the UEs.

SUMMARY

A method of wireless communication is described. The method may include identifying a first numerology for transmitting data to a UE, identifying a second numerology for transmitting a synchronization signal to the UE, configuring at least a first downlink transmission in a regular downlink burst with the first numerology for transmitting at least a portion of the data to the UE, configuring at least a portion of a second downlink transmission in the regular downlink burst with the second numerology for transmitting the synchronization signal to the UE, and transmitting the first downlink transmission and the second downlink transmission to the UE.

An apparatus for wireless communication is described. The apparatus may include means for identifying a first numerology for transmitting data to a UE, means for identifying a second numerology for transmitting a synchronization signal to the UE, means for configuring at least a first downlink transmission in a regular downlink burst with the first numerology for transmitting at least a portion of the data to the UE, means for configuring at least a portion of a second downlink transmission in the regular downlink burst with the second numerology for transmitting the synchronization signal to the UE, and means for transmitting the first downlink transmission and the second downlink transmission to the UE.

Another apparatus for wireless communication is described. The apparatus may include a processor, memory in electronic communication with the processor, and instructions stored in the memory. The instructions may be operable to cause the processor to identify a first numerology for transmitting data to a UE, identify a second numerology for transmitting a synchronization signal to the UE, configure at least a first downlink transmission in a regular downlink burst with the first numerology for transmitting at least a portion of the data to the UE, configure at least a portion of a second downlink transmission in the regular downlink burst with the second numerology for transmitting the synchronization signal to the UE, and transmit the first downlink transmission and the second downlink transmission to the UE.

A non-transitory computer readable medium for wireless communication is described. The non-transitory computer-readable medium may include instructions operable to cause a processor to identify a first numerology for transmitting data to a UE, identify a second numerology for transmitting a synchronization signal to the UE, configure at least a first downlink transmission in a regular downlink burst with the first numerology for transmitting at least a portion of the data to the UE, configure at least a portion of a second downlink transmission in the regular downlink burst with the second numerology for transmitting the synchronization signal to the UE, and transmit the first downlink transmission and the second downlink transmission to the UE.

In some examples of the method, apparatus, and non-transitory computer-readable medium described above, the second downlink transmission may include at least a primary synchronization signal (PSS), or a secondary synchronization signal (SSS), or a physical broadcast channel (PBCH) transmission, or a combination thereof.

In some examples of the method, apparatus, and non-transitory computer-readable medium described above, the configuring at least a portion of the second downlink transmission may include identifying a first portion of one or more symbols of the second downlink transmission for transmitting at least one of the synchronization signal or a broadcast channel transmission to the UE, identifying a second portion of at least one of the one or more symbols of the second downlink transmission for transmitting at least a portion of the data to the UE, configuring the first portion of the one or more symbols with the second numerology, and configuring the second portion of the at least one of the one or more symbols with the first numerology.

In some examples of the method, apparatus, and non-transitory computer-readable medium described above, the configuring at least a portion of the second downlink transmission may include identifying a first subset of a set of symbols of the second downlink transmission for transmitting the synchronization signal to the UE, identifying a second subset of the set of symbols of the second downlink transmission for transmitting at least a portion of the data to the UE, and configuring each symbol of the first subset of the set of symbols and the second subset of the set of symbols with the second numerology.

In some examples of the method, apparatus, and non-transitory computer-readable medium described above, the second downlink transmission may include a set of downlink symbols and a first subset of the set of downlink symbols may be used for transmitting the synchronization signal, and a second subset of the set of downlink symbols may be identified for transmitting a broadcast channel transmission. Some examples of the method, apparatus, and non-transitory computer-readable medium described above may further include processes, features, means, or instructions for configuring the first subset of the set of downlink symbols with the second numerology, and configuring the second subset of the set of downlink symbols with the first numerology.

In some examples of the method, apparatus, and non-transitory computer-readable medium described above, the configuring at least a portion of the second downlink transmission may include identifying a first subset of a set of symbols of the second downlink transmission for transmitting the synchronization signal to the UE, identifying a second subset of the set of symbols of the second downlink transmission for transmitting at least a portion of the data to the UE, configuring each symbol of the first subset of the set of symbols with the second numerology, and configuring each symbol of the second subset of the set of symbols with the first numerology.

In some examples of the method, apparatus, and non-transitory computer-readable medium described above, the second downlink transmission may include a set of downlink symbols and a first subset of the set of downlink symbols may be used for transmitting the synchronization signal, and a second subset of the set of downlink symbols may be identified for transmitting a broadcast channel transmission, and the first subset of the set of downlink symbols and the second subset of the set of downlink symbols may be configured with the second numerology.

Some examples of the method, apparatus, and non-transitory computer-readable medium described above may further include processes, features, means, or instructions for transmitting an indication to the UE to indicate the first numerology, the second numerology, or combinations thereof, is to be used in the second downlink transmission. In some examples of the method, apparatus, and non-transitory computer-readable medium described above, the indication may be transmitted in at least one of minimum system information (MSI), downlink control information (DCI), or a physical broadcast channel transmission transmitted to the UE. Some examples of the method, apparatus, and non-transitory computer-readable medium described above may further include processes, features, means, or instructions for identifying a UE category for the UE, and scheduling a transmission of the data to the UE based at least in part on the UE category and whether a downlink transmission includes the synchronization signal.

In some examples of the method, apparatus, and non-transitory computer-readable medium described above, the transmission of the data to the UE may be unscheduled in a resource block (RB) or symbol of the second downlink transmission that includes the synchronization signal. In some examples of the method, apparatus, and non-transitory computer-readable medium described above, a first portion of the data to be transmitted to the UE may be scheduled in a RB or symbol of the second downlink transmission that includes the synchronization signal, and the first portion of the data may be configured for transmission using the second numerology. In some examples of the method, apparatus, and non-transitory computer-readable medium described above, the transmission of the data to the UE may be unscheduled in a symbol of the second downlink transmission that includes the synchronization signal.

In some examples of the method, apparatus, and non-transitory computer-readable medium described above, the first numerology may be different from the second numerology. In some examples of the method, apparatus, and non-transitory computer-readable medium described above, the first numerology and the second numerology may have a different sub-carrier spacing and cyclic prefix. In some examples of the method, apparatus, and non-transitory computer-readable medium described above, the first numerology may be determined based at least in part on a service that may be associated with the first downlink transmission and the second downlink transmission. In some examples of the method, apparatus, and non-transitory computer-readable medium described above, the second numerology may be different from a data channel or control channel numerology.

A method of wireless communication is described. The method may include identifying a first numerology for receiving data from a base station, identifying a second numerology for receiving a synchronization signal from the base station, demodulating and decoding at least a first received downlink transmission in a regular downlink burst based at least in part on the first numerology, the first received downlink transmission including at least a portion of the data from the base station, and demodulating and decoding at least a portion of a second received downlink transmission in the regular downlink burst based at least in part on the second numerology, the second received downlink transmission including the synchronization signal from the base station.

An apparatus for wireless communication is described. The apparatus may include means for identifying a first numerology for receiving data from a base station, means for identifying a second numerology for receiving a synchronization signal from the base station, means for demodulating and decoding at least a first received downlink transmission in a regular downlink burst based at least in part on the first numerology, the first received downlink transmission including at least a portion of the data from the base station, and means for demodulating and decoding at least a portion of a second received downlink transmission in the regular downlink burst based at least in part on the second numerology, the second received downlink transmission including the synchronization signal from the base station.

Another apparatus for wireless communication is described. The apparatus may include a processor, memory in electronic communication with the processor, and instructions stored in the memory. The instructions may be operable to cause the processor to identify a first numerology for receiving data from a base station, identify a second numerology for receiving a synchronization signal from the base station, demodulate and decoding at least a first received downlink transmission in a regular downlink burst based at least in part on the first numerology, the first received downlink transmission including at least a portion of the data from the base station, and demodulate and decoding at least a portion of a second received downlink transmission in the regular downlink burst based at least in part on the second numerology, the second received downlink transmission including the synchronization signal from the base station.

A non-transitory computer readable medium for wireless communication is described. The non-transitory computer-readable medium may include instructions operable to cause a processor to identify a first numerology for receiving data from a base station, identify a second numerology for receiving a synchronization signal from the base station, demodulate and decoding at least a first received downlink transmission in a regular downlink burst based at least in part on the first numerology, the first received downlink transmission including at least a portion of the data from the base station, and demodulate and decoding at least a portion of a second received downlink transmission in the regular downlink burst based at least in part on the second numerology, the second received downlink transmission including the synchronization signal from the base station.

In some examples of the method, apparatus, and non-transitory computer-readable medium described above, the second received downlink transmission may include at least a PSS, a SSS, or a PBCH transmission, or a combination thereof.

Some examples of the method, apparatus, and non-transitory computer-readable medium described above may further include processes, features, means, or instructions for receiving an indication from the base station indicating the first numerology and the second numerology, and the first numerology and the second numerology may be identified based at least in part on the indication from the base station. In some examples of the method, apparatus, and non-transitory computer-readable medium described above, the indication may be transmitted in one or more of MSI, DCI, or a physical broadcast channel transmission received from the base station.

In some examples of the method, apparatus, and non-transitory computer-readable medium described above, the demodulating and decoding at least a portion of the second received downlink transmission may include identifying a first subset of a set of symbols of the second received downlink transmission for receiving the synchronization signal, identifying a second subset of the set of symbols of the second received downlink transmission for receiving at least a portion of the data, and demodulating and decoding each symbol of the first subset and the second subset of the set of symbols using the second numerology.

In some examples of the method, apparatus, and non-transitory computer-readable medium described above, the demodulating and decoding at least a portion of the second received downlink transmission may include identifying a first portion of one or more symbols of the second downlink transmission for receiving at least one of the synchronization signal or a broadcast channel transmission, identifying a second portion of at least one of the one or more symbols of the second downlink transmission for receiving at least a portion of the data to the UE, demodulating and decoding the first portion of the one or more symbols with the second numerology, and demodulating and decoding the second portion of the at least one of the one or more symbols with the first numerology.

In some examples of the method, apparatus, and non-transitory computer-readable medium described above, the second received downlink transmission may include a set of downlink symbols and a first subset of the set of downlink symbols includes the synchronization signal, and a second subset of the set of downlink symbols may be identified for receiving a broadcast channel transmission. Some examples of the method, apparatus, and non-transitory computer-readable medium described above may further include processes, features, means, or instructions for demodulating and decoding the first subset of the set of downlink symbols using the second numerology, and demodulating and decoding the second subset of the set of downlink symbols using the first numerology.

In some examples of the method, apparatus, and non-transitory computer-readable medium described above, the demodulating and decoding at least a portion of the second received downlink transmission may include identifying a first subset of a set of symbols of the second received downlink transmission for receiving the synchronization signal, identifying a second subset of the set of symbols of the second received downlink transmission for receiving at least a portion of the data, demodulating and decoding each symbol of the first subset of the set of symbols using the second numerology, and demodulating and decoding each symbol of the second subset of the set of symbols using the first numerology.

In some examples of the method, apparatus, and non-transitory computer-readable medium described above, the second received downlink transmission may include a set of downlink symbols and a first subset of the set of downlink symbols includes the synchronization signal, and a second subset of the set of downlink symbols may be identified for receiving a broadcast channel transmission. Some examples of the method, apparatus, and non-transitory computer-readable medium described above may further include processes, features, means, or instructions for demodulating and decoding the first subset of the set of downlink symbols and the second subset of the set of downlink symbols using the second numerology.

In some examples of the method, apparatus, and non-transitory computer-readable medium described above, the first numerology may be different from the second numerology. In some examples of the method, apparatus, and non-transitory computer-readable medium described above, the first numerology and the second numerology may have a different sub-carrier spacing and cyclic prefix. In some examples of the method, apparatus, and non-transitory computer-readable medium described above, the first numerology may be determined based at least in part on a service that may be associated with the first received downlink transmission and the second received downlink transmission. In some examples of the method, apparatus, and non-transitory computer-readable medium described above, the second numerology may be different from a data channel or control channel numerology.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 9 through 11 show block diagrams of a device that supports synchronization and data channel numerology in wireless communications in accordance with aspects of the present disclosure;

DETAILED DESCRIPTION

Figure 1:
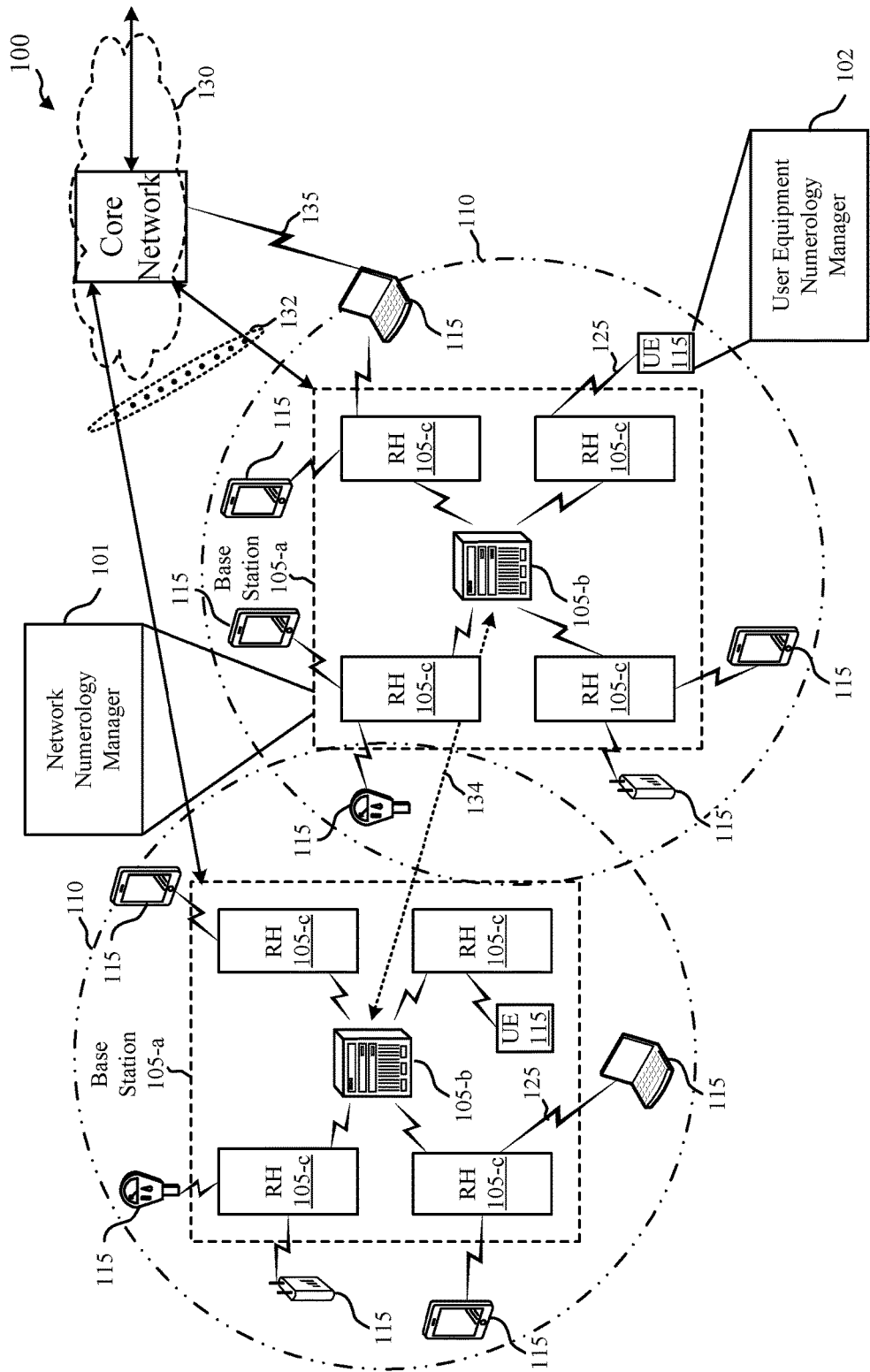
FIG. 1 shows a block diagram of a wireless communication system, in accordance with various aspects of the present disclosure.

Techniques are described that provide for broadcast channel transmissions, synchronization transmissions, or combinations thereof, to be provided with a numerology that may be different than a numerology of a selected service being provided between a UE and a base station. In some examples, a first numerology may be identified for transmitting data to the UE. As indicated above, in some cases different services may be selected for data communications depending upon the nature of the communications. For example, communications that require low latency and high reliability may be served through a lower-latency service (e.g., an ultra-reliable low-latency communication (URLLC) service), while communications that are more delay-tolerant may be served through a service that provides relatively higher throughput with somewhat higher latency such as a mobile broadband service (e.g., an enhanced mobile broadband (eMBB) service). In other examples, communications may be with UEs that are incorporated into other devices (e.g., meters, vehicles, appliances, machinery, etc.), and a machine-type communication (MTC) service (e.g., massive MTC (mMTC)) may be used for such communications. Different services may use different channel numerologies, such as different sub-carrier spacing and cyclic prefixes for example, that help provide efficient communications for the particular service. Thus, the numerology for the particular service that is being provided to the UE may be selected as the first numerology.

Techniques provided herein may also identify a second numerology for a synchronization signal transmission to the UE. Synchronization signal transmissions may include, for example, primary synchronization signal (PSS) transmissions and secondary synchronization signal (SSS) transmissions, which may be periodically transmitted to support a UE in time and frequency synchronization and cell ID detection, for example. In addition to synchronization signal transmissions, a base station may also periodically transmit a PBCH transmissions that may provide a UE with system information (e.g., a master information block (MIB) that may allow the UE to obtain minimum system information (e.g., via a system information block (SIB) or MSIB), or other new radio system information (e.g., minimum system information (MSI), remaining minimum system information (RMSI), and/or other system information (OSI)) that may include information and configurations that may allow the UE to access the network (e.g., via a random access request). A channel bandwidth for synchronization signals and PBCH might be narrower than the system bandwidth used for a service being provided to the UE (e.g., a 5 MHz bandwidth for synchronization signals and PBCH transmissions and a 80 MHz system bandwidth). Furthermore, synchronization signals and PBCH transmissions might be multiplexed with data channel transmissions (e.g., physical downlink shared channel (PDSCH) or physical downlink control channel (PDCCH) transmissions) in both time and frequency.

The second numerology may be different than the first numerology due to, as indicated above, data transmissions using different services based on a type of data. In some cases, different services (e.g., eMBB, URLLC, mMTC) may have different sub-carrier spacing (e.g., 15 kHz, 30 kHz, 60 kHz, 120 kHz, etc.) and different cyclic prefixes, which may be different than the numerology used for synchronization signals and PBCH transmissions.

According to various examples, a base station may configure at least a first downlink transmission in a regular downlink burst with the first numerology for transmitting at least a portion of the data to the UE according to the numerology of the service used for data transmission (e.g., eMBB, URLLC, mMTC), and may configure at least a portion of a second downlink transmission in a regular downlink burst with the second numerology for transmitting the synchronization signal, PBCH, or combinations thereof, to the UE. In some examples, a regular downlink burst may include a number of symbols (e.g., orthogonal frequency division multiplexing (OFDM) symbols), and the synchronization signals and/or PBCH transmissions may be scheduled for transmission in a subset of the symbols. A base station may identify the subset of symbols to be used for synchronization signal transmission, and configure those symbols with the second numerology, and configure remaining symbols in the downlink regular burst with the first numerology. In other cases, the base station may identify one or more symbols in the regular downlink burst as containing PBCH transmissions, configure both the synchronization signal symbols and the PBCH symbols with the second numerology, and configure remaining symbols in the downlink regular burst with the first numerology. In still further examples, a base station may configure all of the symbols in a downlink regular burst containing a synchronization signal or PBCH transmission with the second numerology, and configure symbols of other downlink regular bursts that do not contain a synchronization signal or PBCH transmission with the first numerology. A UE that receives the downlink regular burst may demodulate and decode the symbols in the received transmissions according to the numerology associated with each symbol.

A base station may, in some cases, transmit an indication to the UE to indicate that the first numerology, the second numerology, or combinations thereof, are to be used in the different downlink transmissions. Such an indication may be provided, for example, in a MIB, MSIB, DCI, MSI, RMSI, OSI, PBCH, or PDSCH transmission to the UE. In some examples, the base station may identify a UE category of the UE, which may identify whether the UE can process two or more numerologies in a single symbol. The base station may transmit a synchronization signal in a symbol using the second numerology, and transmit data in the symbol using the first numerology. A UE receiving such a transmission may have to process the received symbol using two or more fast Fourier transforms (FFTs), and thus the base station may refrain from scheduling data in such symbols in the case that the UE is not capable of processing two or more numerologies in a single symbol.

The present disclosure describes various techniques with reference to next generation networks (e.g., 5G or NR networks) that are being designed to support features such as high bandwidth operations, more dynamic subframe/slot types, and self-contained subframe/slot types (in which hybrid automatic repeat request (HARM) feedback for a subframe/slot may be transmitted before the end of the subframe/slot). However, such techniques may be used for any system in which different services that have different numerologies may be used for uplink or downlink communications.

Aspects of the disclosure are initially described in the context of a wireless communications system. Aspects of the disclosure are further illustrated by and described with reference to diagrams, system diagrams, and flowcharts that relate to synchronization and data channel numerology in wireless communications.

FIG. 1 illustrates an example of a wireless communication system 100, in accordance with various aspects of the disclosure. The wireless communication system 100 may include network devices 105, UEs 115, and a core network 130. Wireless communication system 100 may support different numerologies for synchronization signal transmissions and data channel transmissions. For example, wireless communication system 100 may support a first numerology for data channel transmissions in a downlink regular burst and may support a second numerology for synchronization signals or PBCH transmissions in the downlink regular burst or in a different downlink regular burst.

A core network 130 may provide user authentication, access authorization, tracking, Internet Protocol (IP) connectivity, and other access, routing, or mobility functions. At least some of the network devices 105 (e.g., network device 105-*a*, which may be an example of a LTE eNB, an eLTE eNB, radio heads (RHs), an NR gNodeB (gNB), an NR Node-B, an NR access node or a base station, network device 105-*b*, which may be an example of an access node controller (ANC), or a centralized unit) may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-*b* may communicate, either directly or indirectly (e.g., through core network 130), with each other over backhaul links 134 (e.g., X1, X2, Xn etc.), which may be wired or wireless communication links. A UE 115 may communicate with the core network 130 through communication link 135.

Each network device 105-*b* may also communicate with a number of UEs 115 through a number of other network devices 105-*c*, where network device 105-*c* may be an example of a transmission reception point (TRP), a distributed unit (DU), a radio head (RH), a remote radio head (RRH), or a smart radio head. In alternative configurations, various functions of each network device 105 may be distributed across various network devices 105 (e.g., radio heads/distributed units and access network controllers/centralized units) or consolidated into a single network device 105 (e.g., a base station/an access node).

The wireless communication system 100 may support synchronous or asynchronous operation. For synchronous operation, the network devices 105-*a* and/or network devices 105-*c* may have similar frame timing, and transmissions from different network devices 105-*a* and/or network devices 105-*c* may be approximately aligned in time. For asynchronous operation, the network devices 105-*a* and/or network devices 105-*c* may have different frame timings, and transmissions from different network devices 105-*a* and/or network devices 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or one of the layer 2 protocol stack (e.g. Packet Data Convergence Protocol (PDCP)) may be IP-based. One of the layer 2 protocol stack (e.g. PDCP, Radio Link Control (RLC) or Medium Access Control (MAC)) may in some cases perform packet segmentation and reassembly to communicate over logical channels. One of the layer 2 protocol stack (e.g. A Medium Access Control (MAC)) may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, a smart phone, a smart watch, a customer premises equipment (CPE) or the like. A UE 115 may be able to communicate with various types of network devices 105-a, network devices 105-c, base stations, access points, or other network devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include UL channels from a UE 115 to a network device 105, and/or DL channels, from a network device 105 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using TDM techniques, FDM techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communication system 100 may utilize enhanced component carriers (eCCs). An eCC may be characterized by one or more features including: wider bandwidth, shorter symbol duration, and shorter TTIs. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

Wireless communication system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length, and systems that use this region may be referred to as millimeter wave (mmWave) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

As indicated above, wireless communication system 100 may be used for communicating information over a number of different services. Such services may include, for example, data services in which relatively large amounts of data are transmitted over communication links 125. Such data services may be used to transmit voice, video, or other data. In some cases, data services may include an eMBB service. Wireless communication system 100 may also provide URLLC services, which may provide low latency services with high reliability as may be desired in certain applications (e.g., remote control, wireless automation of production facilities, vehicular traffic efficiency and safety, mobile gaming, etc.). Wireless communication system 100 may also provide mMTC services, in which UEs 115 may be incorporated into other devices (e.g., meters, vehicles, appliances, machinery, etc.). Such services may have different and independent air interfaces and channel numerologies that may have, for example, different coding/modulation, separate synchronization channels, different master information blocks (MIBs), different system information blocks (SIBs), different system information (e.g., MSI, RMSI, OSI, or other information transmitted using PBCH or PDSCH) etc. In some cases, a UE 115 or base station 105 may identify different services based on the air interface associated with the particular service. As indicated above, in some examples channel numerologies for all or a portion of certain downlink transmissions may be selected based on whether the downlink transmission includes a synchronization signal transmission, PBCH transmissions, or any combination thereof.

In the example of FIG. 1, base station 105-a may include a network numerology manager 101, which may configure at least a first downlink transmission in a regular downlink burst with the first numerology for transmitting at least a portion of a data channel transmission according to the numerology of a service used for the data channel transmission (e.g., eMBB, URLLC, mMTC), and may configure at least a portion of a second downlink transmission in a regular downlink burst with the second numerology for transmitting a synchronization signal, PBCH, or combinations thereof. The network numerology manager 101 may be an example of a base station numerology manager 1215 as described below with reference to FIG. 12.

UEs 115 may include a UE numerology manager 102, which may identify a first numerology for receiving data from a base station 105 and identify a second numerology for receiving a synchronization signal from the base station 105. The UE 115 may then receive downlink transmissions and may demodulate and decode the symbols in the received transmissions according to the identified numerology. The UE numerology manager 102 may be an example of a UE numerology manager 1615 as described below with reference to FIG. 16.

Figure 2:
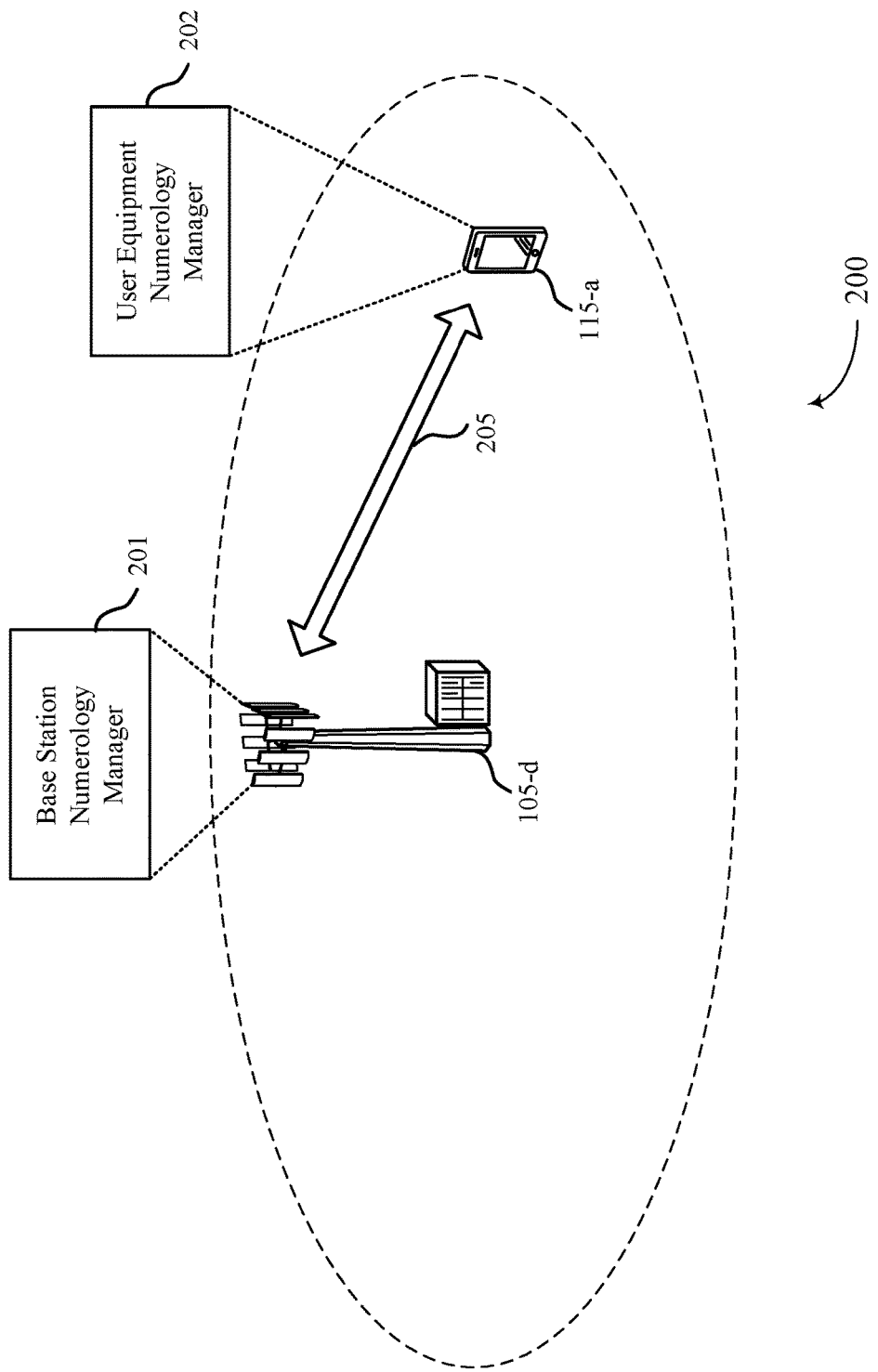
FIG. 2 illustrates an example of a portion of a wireless communication system that supports synchronization and data channel numerology in wireless communications in accordance with aspects of the present disclosure.

FIG. 2 illustrates an example of a portion of a wireless communication system 200 that supports synchronization and data channel numerology in wireless communications in accordance with aspects of the present disclosure. Wireless communication system 200 may include a base station 105-d, and a UE 115-a, which may be examples of the corresponding devices described with reference to FIG. 1. In the example of FIG. 2, the base station 105-d may establish a connection 205 with the UE 115-a, which may be a carrier that is capable of supporting one or more different service types. In the example of FIG. 2, the wireless communication system may operate according to a radio access technology (RAT) such as a 5G or NR RAT, although techniques described herein may be applied to any RAT and to systems that may concurrently use two or more different RATs.

As indicated above, in some examples the wireless communication system 200 may be a portion of a NR or 5G network. Based on growing demand for data and throughput anticipated for 5G, efficient use of radio frequency (RF) spectrum may be necessary to support communications. Such efficient use may include adaptive numerology adjustment for downlink transmissions based on a numerology of the associated transmission, as discussed herein. For example, in some deployments, as indicated above, a 5G or NR network may support multiple types of services, such as eMBB, URLLC, mMTC, etc., that may use different transmission numerologies. Additionally, UEs of different capabilities may be present in such a network, such as UEs capable of receiving and processing multiple numerologies within a same downlink symbol and UEs capable of receiving and processing only a single numerology within a same downlink symbol.

In some examples, the base station 105-d may include a base station numerology manager 201, which may be an example of network numerology manager 101 of FIG. 1, and may be used to configure at least a first downlink transmission in a regular downlink burst with the first numerology for transmitting at least a portion of a data channel transmission according to the numerology of a service used for the data channel transmission (e.g., eMBB, URLLC, mMTC), and may configure at least a portion of a second downlink transmission in a regular downlink burst with the second numerology for transmitting a synchronization signal, PBCH, or combinations thereof. The base station numerology manager 201 may be an example of a base station numerology manager 1215 as described below with reference to FIG. 12.

The UE 115-a may include a UE numerology manager 202, which may be an example of UE numerology manager 102 of FIG. 1, and each of which may be used to identify a first numerology for receiving data from the base station 105-d and identify a second numerology for receiving a synchronization signal from the base station 105-d. The UE 115-a may then receive downlink transmissions and may demodulate and decode the symbols in the received transmissions according to the identified numerology. The UE numerology manager 202 may be an example of a UE numerology manager 1615 as described below with reference to FIG. 16.

Figure 3A:
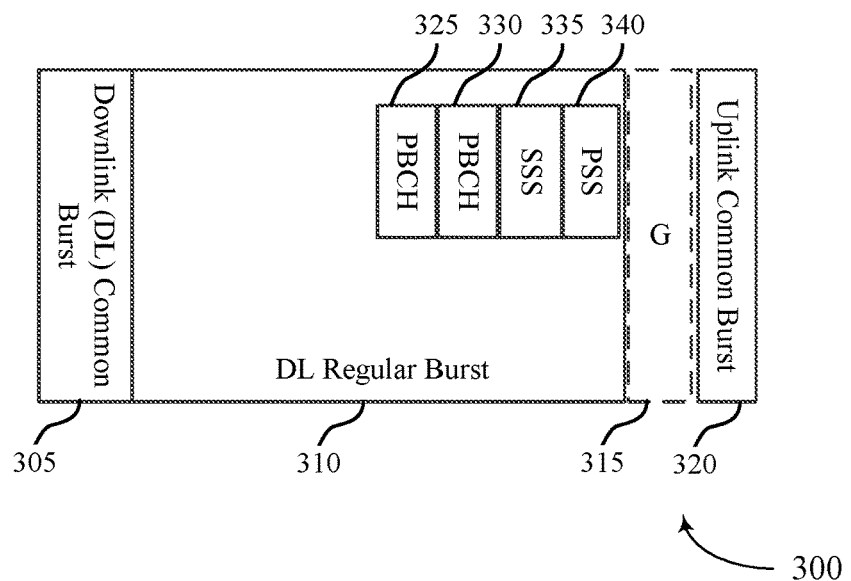
FIGS. 3A and 3B illustrate examples of downlink transmissions that support synchronization and data channel numerology in wireless communications in accordance with aspects of the present disclosure.

FIG. 3A illustrates an example of a TDD downlink-centric subframe 300, which may also be referred to as a downlink-centric slot, that supports different synchronization and data channel numerology in wireless communications in accordance with aspects of the present disclosure. In some examples, the DL-centric subframe/slot 300 may be selected by a network access device such as a base station 105 of FIGS. 1-2, for communications for a particular service with a UE such as UEs 115 of FIGS. 1-2. The base stations and UEs that communicate in the subframe/slot 300 may be examples of aspects of the base stations 105 and UEs 115 described with reference to FIGS. 1-2. While various examples described herein use downlink-centric or uplink-centric subframes/slots, it will be understood that the techniques described are equally applicable to other types of subframes/slots, such as pure downlink or uplink subframes/slots.

The downlink-centric subframe/slot 300 may begin with a downlink common burst 305, that may include, for example, a DL control symbol containing a cell-specific reference signal (CRS) and PDCCH transmissions. Following the downlink common burst 305, a downlink regular burst 310 may be transmitted, which may include a number of downlink data symbols that may include, for example, PDSCH transmissions to a UE based on a service being provided to the UE. Following the downlink regular burst 310, a guard period 315 may be provided to allow the UE to perform RF switching from downlink receptions to uplink transmissions. Following the guard period 315, an uplink common burst 320 may be transmitted by the UE. The uplink common burst 320 may include an uplink control symbol that may include information such as a sounding reference signal (SRS), scheduling request (SR), feedback (e.g., ACK/NACK information), or UL data. Such an uplink common burst 320 may allow for a self-contained subframe/slot 300, in which feedback on successful reception of data in the downlink regular burst 310 may be provided within the same subframe/slot, which may provide for lower latency and enhanced data throughput relative to providing feedback information in some number of subframes/slots after the downlink-centric subframe/slot 300.

As indicated above, synchronization signals and PBCH transmissions may be periodically transmitted by a base station to a UE. In this example, downlink-centric subframe/slot 300 may include a PBCH transmission 325 in a downlink symbol of downlink regular burst 310, a second PBCH transmission 330 in the downlink regular burst, a SSS transmission 335 in another downlink symbol, and a PSS transmission 340 in another downlink symbol. In some cases, the service being used for communication between the UE and the base station may have a channel numerology that is different than the numerology of the PSS transmission 340, SSS transmission 335, and/or the PBCH transmissions 325-330.

Figure 3B:
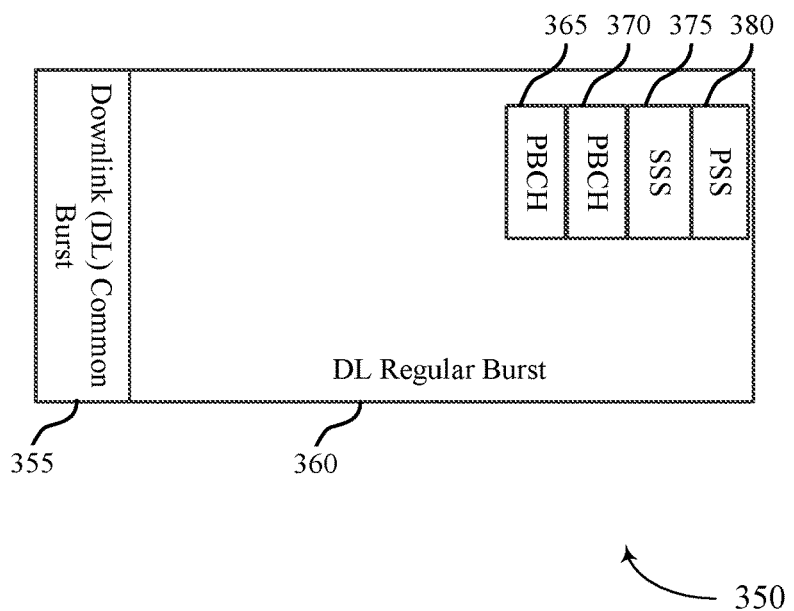

While the example of FIG. 3A illustrates a TDD downlink-centric subframe/slot, the techniques provided herein may be used for any transmissions in which a synchronization signal or control channel transmission may use a different numerology than a data channel transmission. FIG. 3B illustrates one such example, in which a FDD downlink subframe/slot 350 may support different synchronization and data channel numerology in wireless communications in accordance with aspects of the present disclosure. The base stations and UEs that communicate in the subframe/slot 350 may be examples of aspects of the base stations 105 and UEs 115 described with reference to FIGS. 1-2. Aspects described above with respect to TDD subframes/slots also apply to the FDD downlink subframe/slot 350. For example, downlink subframe/slot 350 may begin with a downlink common burst 355, that may include, for example, a DL control symbol containing CRS and PDCCH transmissions, followed by a downlink regular burst 360. In this example, a separate uplink subframe/slot may be transmitted by the UE, and thus the FDD downlink subframe/slot 350 does not include any uplink portion. As with the downlink-centric subframe/slot 300, the FDD downlink subframe/slot 350 may include a PBCH transmission 365 in a downlink symbol of downlink regular burst 360, a second PBCH transmission 370 in the downlink regular burst, a SSS transmission 375 in another downlink symbol, and a PSS transmission 380 in another downlink symbol. Again, the service being used for communication between the UE and the base station may have a channel numerology that is different than the numerology of the PSS transmission 380, SSS transmission 375, and/or the PBCH transmissions 365-370.

Figure 4:
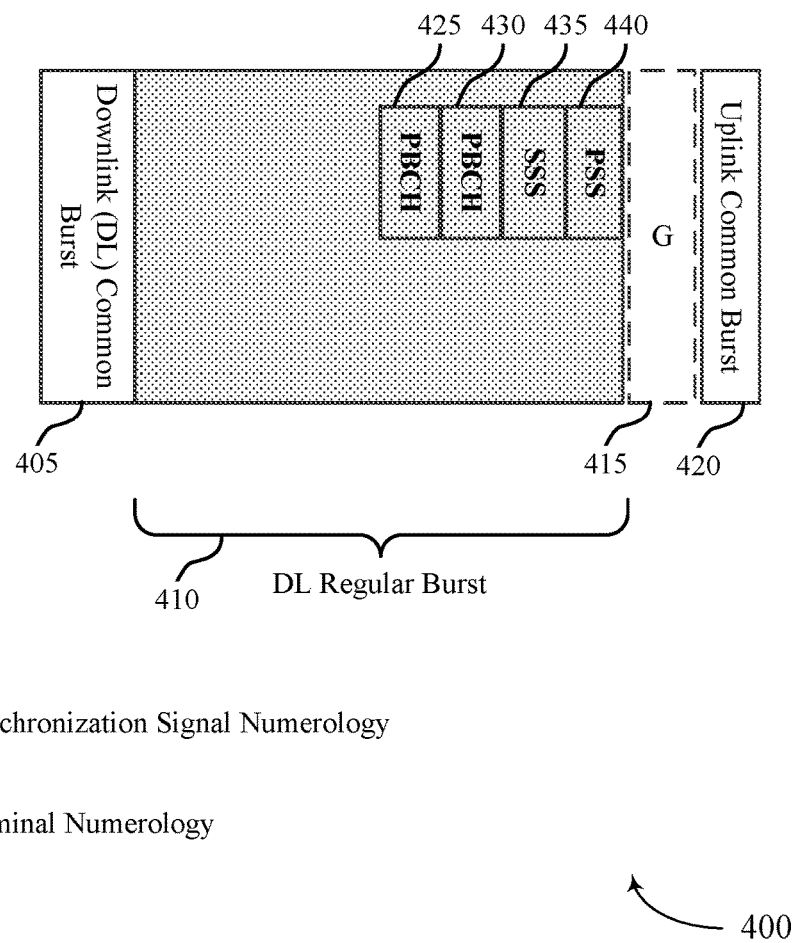
FIG. 4 illustrates an example of a downlink transmission that supports synchronization and data channel numerology in wireless communications in accordance with aspects of the present disclosure.

FIG. 4 illustrates an example of a downlink transmission 400 for synchronization and data channel numerology in wireless communications in accordance with aspects of the present disclosure. In some examples, the downlink transmission 400 may be selected by a network access device such as a base station 105 of FIGS. 1-2, for communications for a particular service with a UE such as UEs 115 of FIGS. 1-2. The base stations and UEs that communicate in the downlink transmission 400 may be examples of aspects of the base stations 105 and UEs 115 described with reference to FIGS. 1-2. While the examples of FIGS. 4-8 describe downlink-centric transmissions that may be used in a TDD system, the discussed techniques may be used in other transmissions, such as FDD transmissions, as well.

The downlink transmission 400 may, similarly as discussed above with respect to FIG. 3, begin with a downlink common burst 405, that may include a DL control symbol containing CRS and PDCCH transmissions, for example. Following the downlink common burst 405, a downlink regular burst 410 may be transmitted, which may include a number of downlink data symbols that may include, for example, PDSCH transmissions to a UE based on a service being provided to the UE. Following the downlink regular burst 410, a guard period 415 may be provided to allow the UE to perform RF switching from downlink receptions to uplink transmissions. Following the guard period 415, an uplink common burst 420 may be transmitted by the UE. The uplink common burst 420 may include an uplink control symbol that may include information such as a SRS, SR, feedback (e.g., ACK/NACK information), or UL data.

As indicated above, synchronization signals and PBCH transmissions may be periodically transmitted by a base station to a UE. In this example, downlink transmission 400 may include a PBCH transmission 425 in a downlink symbol of downlink regular burst 410, a second PBCH transmission 430 in the downlink regular burst, a SSS transmission 435 in another downlink symbol, and a PSS transmission 440 in another downlink symbol. In this example, the entire downlink regular burst 410 may be transmitted using a synchronization signal numerology, while other downlink regular bursts of other downlink transmissions may use a nominal numerology for the particular service being provided (e.g., URLLC, eMBB, mMTC, etc.). In such examples, a UE may be signaled that any subframe that includes a synchronization signal or PBCH transmission is to use the numerology associated with the synchronization signal for the downlink regular burst symbols. The UE may then demodulate and decode all of the downlink regular burst 410 symbols according to the synchronization signal numerology. Such demodulation and decoding processing may allow the UE to use a single FFT for the receive signal processing for the entire downlink regular burst 410.

Figure 5:
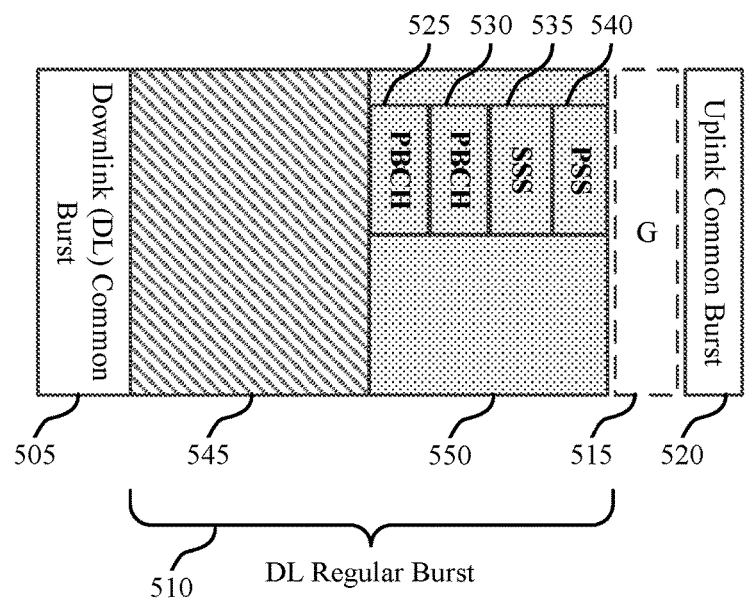
FIG. 5 illustrates an example of another downlink transmission that supports synchronization and data channel numerology in wireless communications in accordance with aspects of the present disclosure.

FIG. 5 illustrates an example of another downlink transmission 500 that supports synchronization and data channel numerology in wireless communications in accordance with aspects of the present disclosure. In some examples, the downlink transmission 500 may be selected by a network access device such as a base station 105 of FIGS. 1-2, for communications for a particular service with a UE such as UEs 115 of FIGS. 1-2. The base stations and UEs that communicate in the downlink transmission 500 may be examples of aspects of the base stations 105 and UEs 115 described with reference to FIGS. 1-2.

The downlink transmission 500 may, similarly as discussed above with respect to FIGS. 3-4, begin with a downlink common burst 505, that may include a DL control symbol containing CRS and PDCCH transmissions, for example. Following the downlink common burst 505, a downlink regular burst 510 may be transmitted, which may include a number of downlink data symbols that may include, for example, PDSCH transmissions to a UE based on a service being provided to the UE. Following the downlink regular burst 510, a guard period 515 may be provided to allow the UE to perform RF switching from downlink receptions to uplink transmissions. Following the guard period 515, an uplink common burst 520 may be transmitted by the UE. The uplink common burst 520 may include an uplink control symbol that may include information such as a SRS, SR, feedback (e.g., ACK/NACK information), or UL data.

Similarly as above, in this example, downlink transmission 500 may include a PBCH transmission 525 in a downlink symbol of downlink regular burst 510, a second PBCH transmission 530 in the downlink regular burst, a SSS transmission 535 in another downlink symbol, and a PSS transmission 540 in another downlink symbol. In this example, a first portion 545 of the downlink regular burst 510, such as a first subset of downlink symbols of the downlink regular burst 510, may be transmitted using a nominal numerology of the service associated with data transmissions, and a second portion 550 of the downlink regular burst 510, such as a second subset of downlink symbols of the downlink regular burst 510 that include PBCH transmissions 525 and 530, SSS transmission 535 and PSS transmission 540, may be transmitted using the synchronization signal numerology. In such examples, a UE may be signaled that any subframe that includes a synchronization signal or PBCH transmission is to use the numerology associated with the synchronization signal for symbols having a synchronization signal or PBCH transmission. The UE may then demodulate and decode all of the downlink regular burst 510 symbols according to the associated synchronization signal numerology. Such demodulation and decoding processing may allow the UE to use a single FFT for the receive signal processing for the entire downlink regular burst 510.

Figure 6:
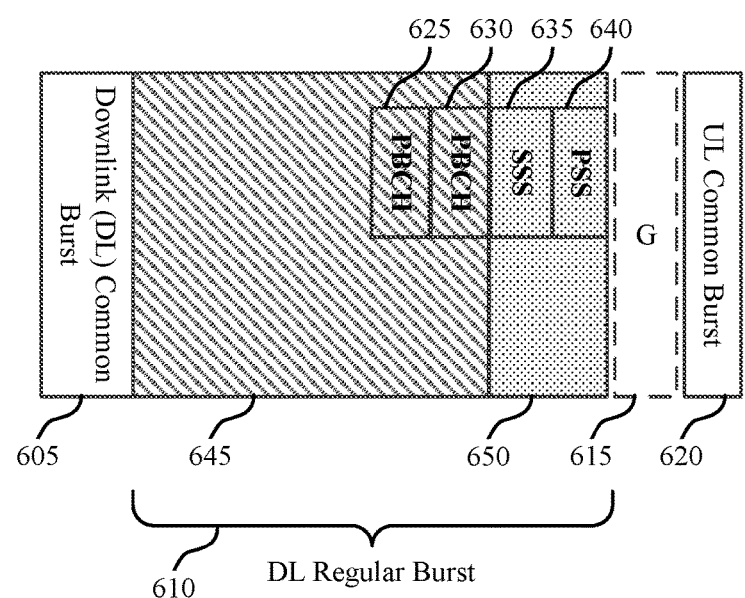
FIG. 6 illustrates an example of another downlink transmission that supports synchronization and data channel numerology in wireless communications in accordance with aspects of the present disclosure.
Figure 6:
Figure 6:
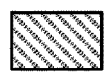

FIG. 6 illustrates an example of another downlink transmission 600 that supports synchronization and data channel numerology in wireless communications in accordance with aspects of the present disclosure. In some examples, the downlink transmission 600 may be selected by a network access device such as a base station 105 of FIGS. 1-2, for communications for a particular service with a UE such as UEs 115 of FIGS. 1-2. The base stations and UEs that communicate in the downlink transmission 600 may be examples of aspects of the base stations 105 and UEs 115 described with reference to FIGS. 1-2.

The downlink transmission 600 may, similarly as discussed above with respect to FIGS. 3-5, begin with a downlink common burst 605, that may include a DL control symbol containing CRS and PDCCH transmissions, for example. Following the downlink common burst 605, a downlink regular burst 610 may be transmitted, which may include a number of downlink data symbols that may include, for example, PDSCH transmissions to a UE based on a service being provided to the UE. Following the downlink regular burst 610, a guard period 615 may be provided to allow the UE to perform RF switching from downlink receptions to uplink transmissions. Following the guard period 615, an uplink common burst 620 may be transmitted by the UE. The uplink common burst 620 may include an uplink control symbol that may include information such as a SRS, SR, feedback (e.g., ACK/NACK information), or UL data.

Similarly as above, in this example, downlink transmission 600 may include a PBCH transmission 625 in a downlink symbol of downlink regular burst 610, a second PBCH transmission 630 in the downlink regular burst, a SSS transmission 635 in another downlink symbol, and a PSS transmission 640 in another downlink symbol. In this example, a first portion 645 of the downlink regular burst 610, such as a first subset of downlink symbols of the downlink regular burst 610, may be transmitted using a nominal numerology of the service associated with data transmissions, including symbols that include PBCH transmissions 625 and 630. A second portion 650 of the downlink regular burst 610, such as a second subset of downlink symbols of the downlink regular burst 610 that include SSS transmission 635 and PSS transmission 640, may be transmitted using the synchronization signal numerology. In such examples, a UE may be signaled that any subframe that includes a synchronization signal transmission is to use the numerology associated with the synchronization signal for symbols having a synchronization signal, and the nominal numerology for symbols with a PBCH transmission. The UE may then demodulate and decode all of the downlink regular burst 610 symbols according to the associated synchronization signal numerology. Such demodulation and decoding processing may allow the UE to use a single FFT for the receive signal processing for the entire downlink regular burst 610. A UE in such cases may perform blind PBCH detection across multiple PBCH location hypotheses to locate the PBCH transmissions, but data transmitted in those symbols may continue to be transmitted using the nominal numerology, which may provide enhanced efficiency for the data transmissions.

Figure 7:
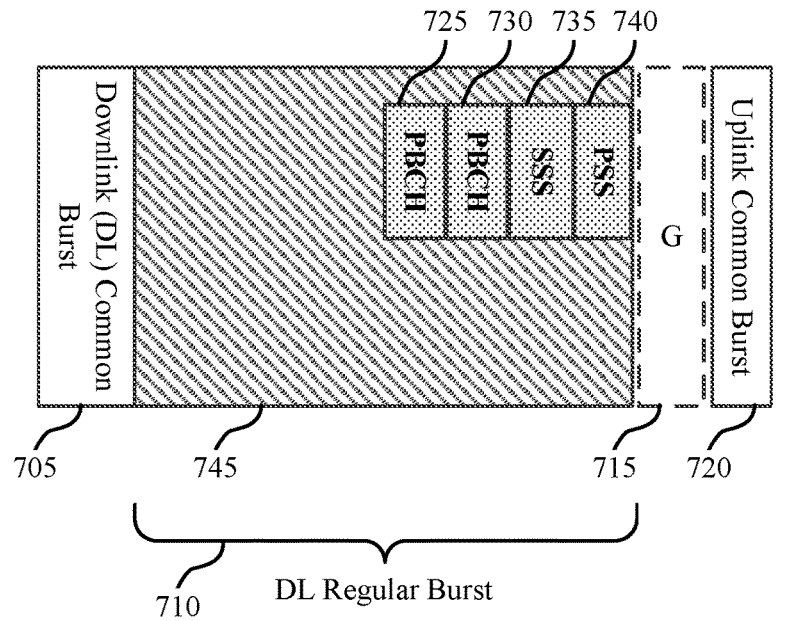
FIG. 7 illustrates an example of another downlink transmission that supports synchronization and data channel numerology in wireless communications in accordance with aspects of the present disclosure.
Figure 7:
Figure 7:

FIG. 7 illustrates an example of another downlink transmission 700 that supports synchronization and data channel numerology in wireless communications in accordance with aspects of the present disclosure. In some examples, the downlink transmission 700 may be selected by a network access device such as a base station 105 of FIGS. 1-2, for communications for a particular service with a UE such as UEs 115 of FIGS. 1-2. The base stations and UEs that communicate in the downlink transmission 700 may be examples of aspects of the base stations 105 and UEs 115 described with reference to FIGS. 1-2.

The downlink transmission 700 may, similarly as discussed above with respect to FIGS. 3-6, begin with a downlink common burst 705, which may include a DL control symbol containing CRS and PDCCH transmissions, for example. Following the downlink common burst 705, a downlink regular burst 710 may be transmitted, which may include a number of downlink data symbols that may include, for example, PDSCH transmissions to a UE based on a service being provided to the UE. Following the downlink regular burst 710, a guard period 715 may be provided to allow the UE to perform RF switching from downlink receptions to uplink transmissions. Following the guard period 715, an uplink common burst 720 may be transmitted by the UE. The uplink common burst 720 may include an uplink control symbol that may include information such as a SRS, SR, feedback (e.g., ACK/NACK information), or UL data.

Similarly as above, in this example, downlink transmission 700 may include a PBCH transmission 725 in a downlink symbol of downlink regular burst 710, a second PBCH transmission 730 in the downlink regular burst, a SSS transmission 735 in another downlink symbol, and a PSS transmission 740 in another downlink symbol. In this example, portions 745 of each symbol of the downlink regular burst 710 that do not contain PBCH or synchronization signal transmissions may be transmitted using a nominal numerology of the service associated with data transmissions. For portions of the symbols that do include PBCH transmissions 725 and 730, SSS transmission 735, and PSS transmission 740, the synchronization signal numerology may be used. In some cases, a guard band may be provided between the nominal numerology transmission 745 and the synchronization signal numerology used for PBCH transmissions 725 and 730, SSS transmission 735, and PSS transmission 740. The UE may then demodulate and decode all of the downlink regular burst 710 symbols according to the nominal numerology and demodulate and decode only portions of symbols containing PBCH transmissions 725 and 730, SSS transmission 735, and PSS transmission 740 using the synchronization signal numerology. In some examples, PBCH transmissions 725 and 730 may also be transmitted using the nominal numerology. Such demodulation and decoding processing may require a UE to use multiple FFTs for receive signal processing of symbols that include PBCH or synchronization signal transmissions, but data transmitted in those symbols may continue to be transmitted using the nominal numerology, which may provide enhanced efficiency for the data transmissions. In cases where a UE is capable of only a single FFT in receive processing for a downlink symbol, a base station may unschedule any data transmissions for such symbols, thus allowing the UE to receive the PBCH or synchronization signal transmissions. In other cases, a UE may skip attempts to detect synchronization signal or PBCH transmissions in such symbols.

As indicated above, in some cases a UE may provide a UE category to a serving base station, that may indicate certain capabilities of the UE, such as the ability to perform just one or more than one FFT for a received downlink symbol. A base station may thus schedule UEs for receptions of data according to a nominal numerology or a synchronization signal numerology based at least in part on the UE capability. A base station may provide signaling of the different numerologies to use for particular downlink transmissions through, for example, MIB, PBCH, MSIR, RMSI, MSI, OSI, or DCI transmissions, or any combination thereof. In cases where a UE is not capable of multiple FFTs at a time, in a PSS/SSS/PBCH slot, it may be scheduled such that the UE is not scheduled in resource blocks (RBs) or symbols containing PSS/SSS/PBCH, and may be scheduled in other RBs with a same numerology as PSS/SSS/PBCH or a different numerology as PSS/SSS/PBCH. In other cases, a UE may also be scheduled in RBs or symbols containing PSS/SSS/PBCH, in which case the same reference numerology as PSS/SSS/PBCH may to be used for the entire RB or symbol. In other cases, a UE may be scheduled only in symbols not containing PSS/SSS/PBCH in a PSS/SSS/PBCH slot. The different scheduling alternatives may depend, for example, on the service for the data channel transmissions. For example, for an eMBB service, the third alternative may be sufficient due to the relative latency insensitive service, but for URLLC services, due to tight delay budgets, the first or second alternatives may be used.

Figure 8:
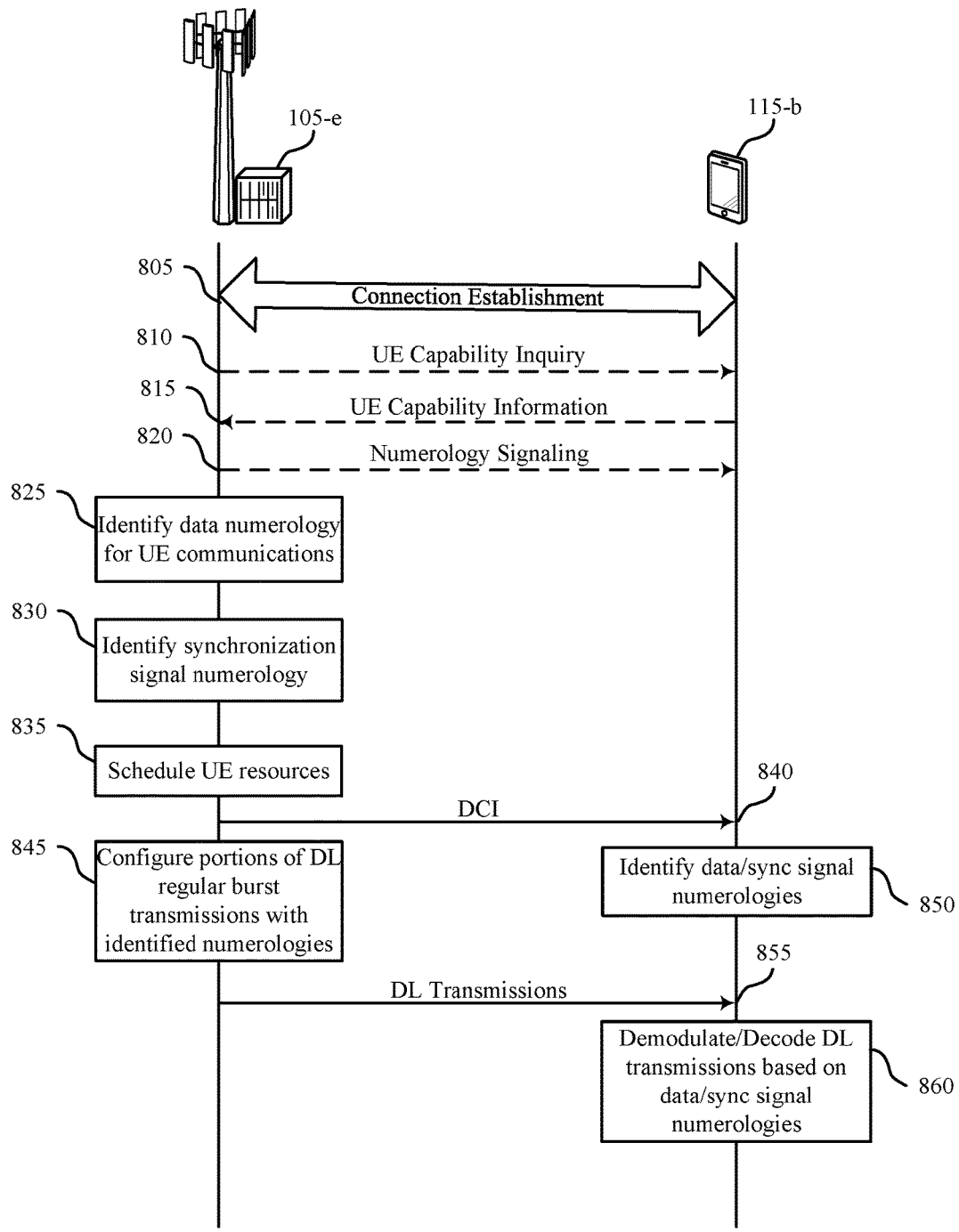
FIG. 8 illustrates an example of a process flow that supports synchronization and data channel numerology in wireless communications in accordance with aspects of the present disclosure.

FIG. 8 illustrates an example of a process flow 800 that supports synchronization and data channel numerology in wireless communications in accordance with aspects of the present disclosure. Process flow 800 may include base station 105-e and UE 115-b, which may be examples of the corresponding devices described with reference to FIG. 1-2. The base station 105-e and the UE 115-b may establish a connection 805 according to established connection establishment techniques. In some examples, base station 105-e may transmit optional UE capability inquiry 810, and the UE 115-b may transmit responsive UE capability information 815, that the base station 105-e may use for scheduling of data transmissions to the UE 115-b. The base station 105-e may also optionally provide numerology signaling 820 to the UE 115-b, that may indicate numerologies to be used for data channel transmissions, PBCH transmissions, and synchronization signal transmissions.

At 825, the base station 105-e may identify a data numerology for UE communication. Such an identification may be made, for example, based on a service associated with the data channel transmissions, and a nominal numerology associated with the particular service. At 830, the base station 105-e may identify a synchronization signal numerology for transmission of synchronization signals and optionally for transmission of PBCH transmissions. The synchronization signal numerology may be identified based on, for example, a fixed numerology that us used for transmitting synchronization signals irrespective of a data channel numerology that is to be used for a data channel transmission associated with a particular service.

At 835, the base station 105-e may schedule UE resources. Such UE resources may include, for example, uplink resources for uplink transmissions from the UE 115-b, downlink resources for PDSCH transmission to the UE 115-b, and in some cases may include resources for other items, such as semi-persistent scheduling (SPS), etc. The scheduled UE resources may be provided to the UE 115-b in DCI transmission 840.

At 845, the base station 105-e may configure portions of a downlink regular burst with identified numerologies. Such configuration may include, for example, configuring all symbols of a downlink regular burst that include a PBCH or synchronization signal transmission with the identified synchronization signal numerology. In other examples, downlink symbols that include PBCH or synchronization signal transmissions may be configured with the identified synchronization signal numerology, and remaining symbols of the downlink regular burst may be configured with the data numerology. In further examples, downlink symbols that include synchronization signal transmissions may be configured with the identified synchronization signal numerology, and remaining symbols, including symbols that include PBCH transmissions, may be configured with the data numerology. The base station 105-e may transmit downlink transmissions 855 to the UE 115-b.

The UE 115-b may, at 850, identify data and synchronization signal numerologies. In some cases, the UE 115-b may identify that different portions of a downlink regular burst are to use particular numerologies based on the presence or absence of a PBCH transmissions or a synchronization signal, or any combination thereof, as discussed herein. In some case, the UE 115-b may be scheduled for data channel transmissions based on whether particular symbols or RBs include PBCH or synchronization signal transmissions. At 860, the UE 115-b may demodulate and decode the downlink transmissions based on the data numerology and synchronization signal numerology that have been identified for downlink transmissions.

FIG. 9 shows a block diagram 900 of a device 905 that supports synchronization and data channel numerology in wireless communications in accordance with various aspects of the present disclosure. Device 905 may be an example of aspects of a base station 105 as described with reference to FIGS. 1, 2, and 8. Device 905 may include receiver 910, base station numerology manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to synchronization and data channel numerology in wireless communications, etc.). Information may be passed on to other components of the device. The receiver 910 may be an example of aspects of the transceiver 1235 described with reference to FIG. 12. Base station numerology manager 915 may be an example of aspects of the base station numerology manager 1215 described with reference to FIG. 12.

Base station numerology manager 915 may identify a first numerology for transmitting data to a UE, identify a second numerology for transmitting a synchronization signal to the UE, configure at least a first downlink transmission in a regular downlink burst with the first numerology for transmitting at least a portion of the data to the UE, and configure at least a portion of a second downlink transmission in the regular downlink burst with the second numerology for transmitting the synchronization signal to the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas. In some examples, transmitter 920 may transmit the first downlink transmission and the second downlink transmission to the UE.

Figure 10:
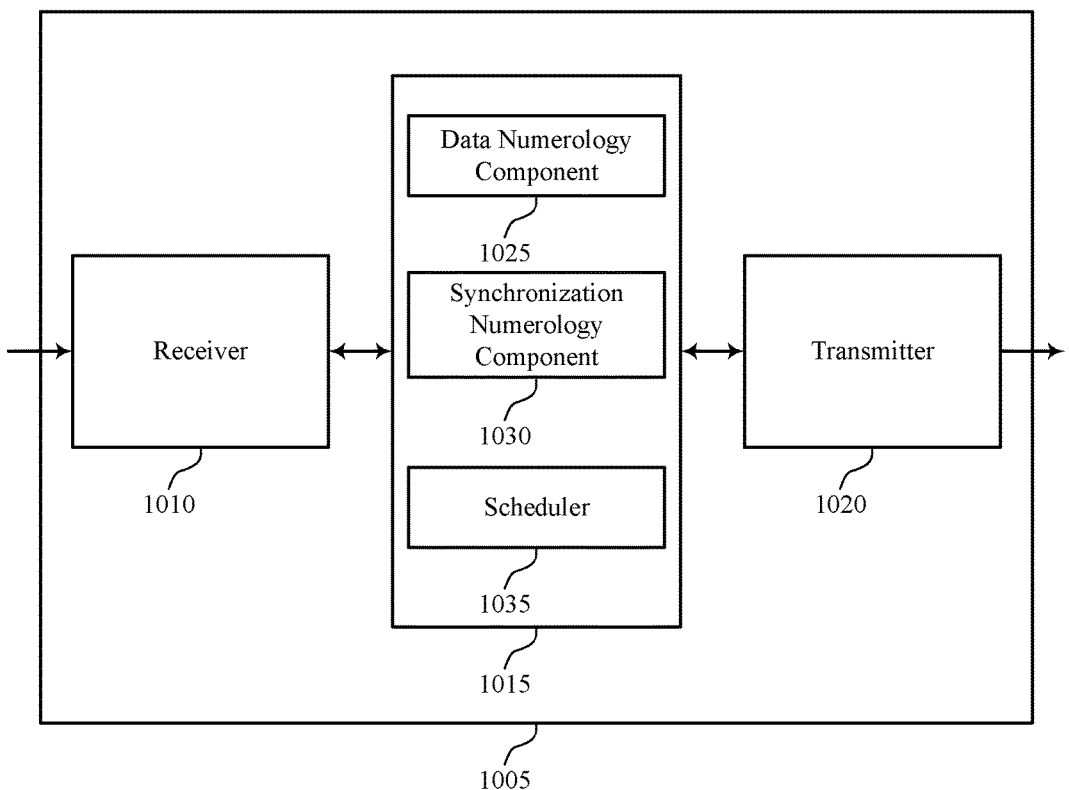

FIG. 10 shows a block diagram 1000 of a device 1005 that supports synchronization and data channel numerology in wireless communications in accordance with various aspects of the present disclosure. Device 1005 may be an example of aspects of a device 905 or a base station 105 as described with reference to FIGS. 1, 2, 8 and 9. Device 1005 may include receiver 1010, base station numerology manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to synchronization and data channel numerology in wireless communications, etc.). Information may be passed on to other components of the device. The receiver 1010 may be an example of aspects of the transceiver 1235 described with reference to FIG. 12.

station numerology manager 1015 may be an example of aspects of the base station numerology manager 1215 described with reference to FIG. 12. Base station numerology manager 1015 may also include data numerology component 1025, synchronization numerology component 1030, and scheduler 1035.

Data numerology component 1025 may identify a first numerology for transmitting data to a UE in a first downlink transmission. Such a first numerology may be identified, for example, based on a service being provided to the UE, as discussed herein.

Synchronization numerology component 1030 may identify a second numerology for transmitting a synchronization signal to the UE in a second downlink transmission. In some cases, the second downlink transmission includes at least a PSS, a SSS, or a PBCH transmission, or a combination thereof. In some cases, the first numerology is different from the second numerology. In some cases, the first numerology and the second numerology have a different sub-carrier spacing and cyclic prefix. In some cases, the second numerology is different from a data channel or control channel numerology.

Scheduler 1035 may configure the first downlink transmission in a regular downlink burst with the first numerology for transmitting at least a portion of the data to the UE, and configure the second downlink transmission with the second numerology for transmitting a synchronization signal. In some examples, each symbol of a first subset of a set of symbols and a second subset of the set of symbols may be configured with the second numerology. In some cases, the scheduler 1035 may configure one or more symbols of the first subset of the set of symbols with the second numerology, and configure one or more symbols of the second subset with the first numerology. In some cases, the scheduler 1035 may schedule a transmission of the data to the UE based on the UE category and whether a downlink transmission includes the synchronization signal. In some cases, the transmission of the data to the UE is unscheduled in a symbol of the second downlink transmission that includes the synchronization signal. In some cases, the transmission of the data to the UE is unscheduled in a resource block (RB) or symbol of the second downlink transmission that includes the synchronization signal. In some cases, a first portion of the data to be transmitted to the UE is scheduled in a RB or symbol of the second downlink transmission that includes the synchronization signal, and where the first portion of the data is configured for transmission using the second numerology.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
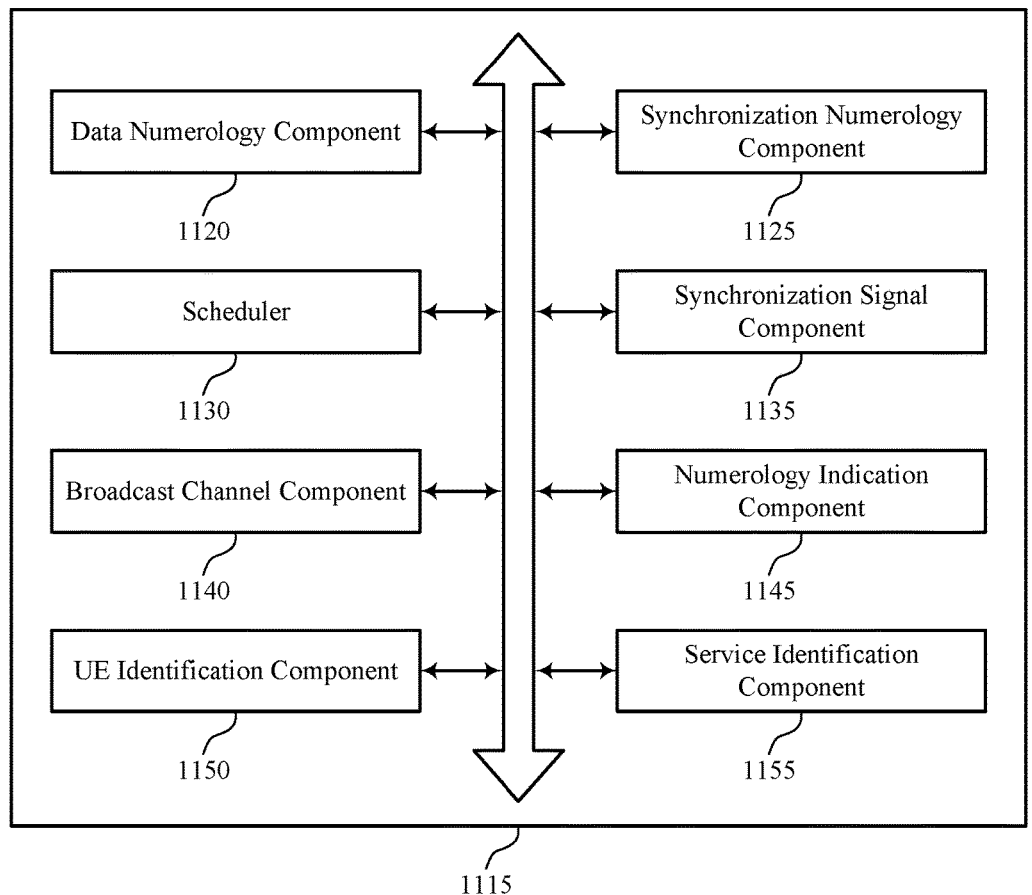

FIG. 11 shows a block diagram 1100 of a base station numerology manager 1115 that supports synchronization and data channel numerology in wireless communications in accordance with various aspects of the present disclosure.

The base station numerology manager 1115 may be an example of aspects of a base station numerology manager 915, a base station numerology manager 1015, or a base station numerology manager 1215 described with reference to FIGS. 9, 10, and 12. The base station numerology manager 1115 may include data numerology component 1120, synchronization numerology component 1125, scheduler 1130, synchronization signal component 1135, broadcast channel component 1140, numerology indication component 1145, UE identification component 1150, and service identification component 1155. Each of these modules may communicate, directly or indirectly, with one another (e.g., via one or more buses).

Data numerology component 1120 may identify a first numerology for transmitting data to a UE. Such a determination may be made based at least in part on a service to be provided to the UE, for example. Synchronization numerology component 1125 may identify a second numerology for transmitting a synchronization signal to the UE. In some cases, a second downlink transmission includes at least a PSS, or a SSS, or PBCH transmission, or a combination thereof. In some cases, the first numerology is different from the second numerology. In some cases, the first numerology and the second numerology have a different sub-carrier spacing and cyclic prefix. In some cases, the second numerology is different from a data channel or control channel numerology.

Scheduler 1130 may configure the first downlink transmission in a regular downlink burst with the first numerology for transmitting at least a portion of the data to the UE, and configure the second downlink transmission with the second numerology for transmitting a synchronization signal. In some examples, each symbol of a first subset of a set of symbols and a second subset of the set of symbols may be configured with the second numerology. In some cases, the scheduler 1130 may configure one or more symbols of the first subset of the set of symbols with the second numerology, and configure one or more symbols of the second subset with the first numerology. In some cases, the scheduler 1130 may schedule a transmission of the data to the UE based on the UE category and whether a downlink transmission includes the synchronization signal. In some cases, the transmission of the data to the UE is unscheduled in a symbol of the second downlink transmission that includes the synchronization signal. In some cases, the transmission of the data to the UE is unscheduled in a resource block (RB) or symbol of the second downlink transmission that includes the synchronization signal. In some cases, a first portion of the data to be transmitted to the UE is scheduled in a RB or symbol of the second downlink transmission that includes the synchronization signal, and where the first portion of the data is configured for transmission using the second numerology.

Synchronization signal component 1135 may identify a first subset of a set of symbols of the second downlink transmission for transmitting the synchronization signal to the UE and identify a second subset of the set of symbols of the second downlink transmission for transmitting at least a portion of the data to the UE. Broadcast channel component 1140 may identify a second subset of the set of downlink symbols for transmitting a broadcast channel transmission.

Numerology indication component 1145 may transmit an indication to the UE to indicate the first numerology, the second numerology, or combinations thereof, are to be used in downlink transmissions. In some cases, the indication is transmitted in at least one of a MIB, MSIB, MSI, RMSI, OSI, DCI, or a PBCH or PDSCH transmission transmitted to the UE. UE identification component 1150 may identify a UE category for the UE.

Service identification component 1155 may in some cases, assist in determining the first numerology based on a service that is associated with the first downlink transmission and the second downlink transmission.

Figure 12:
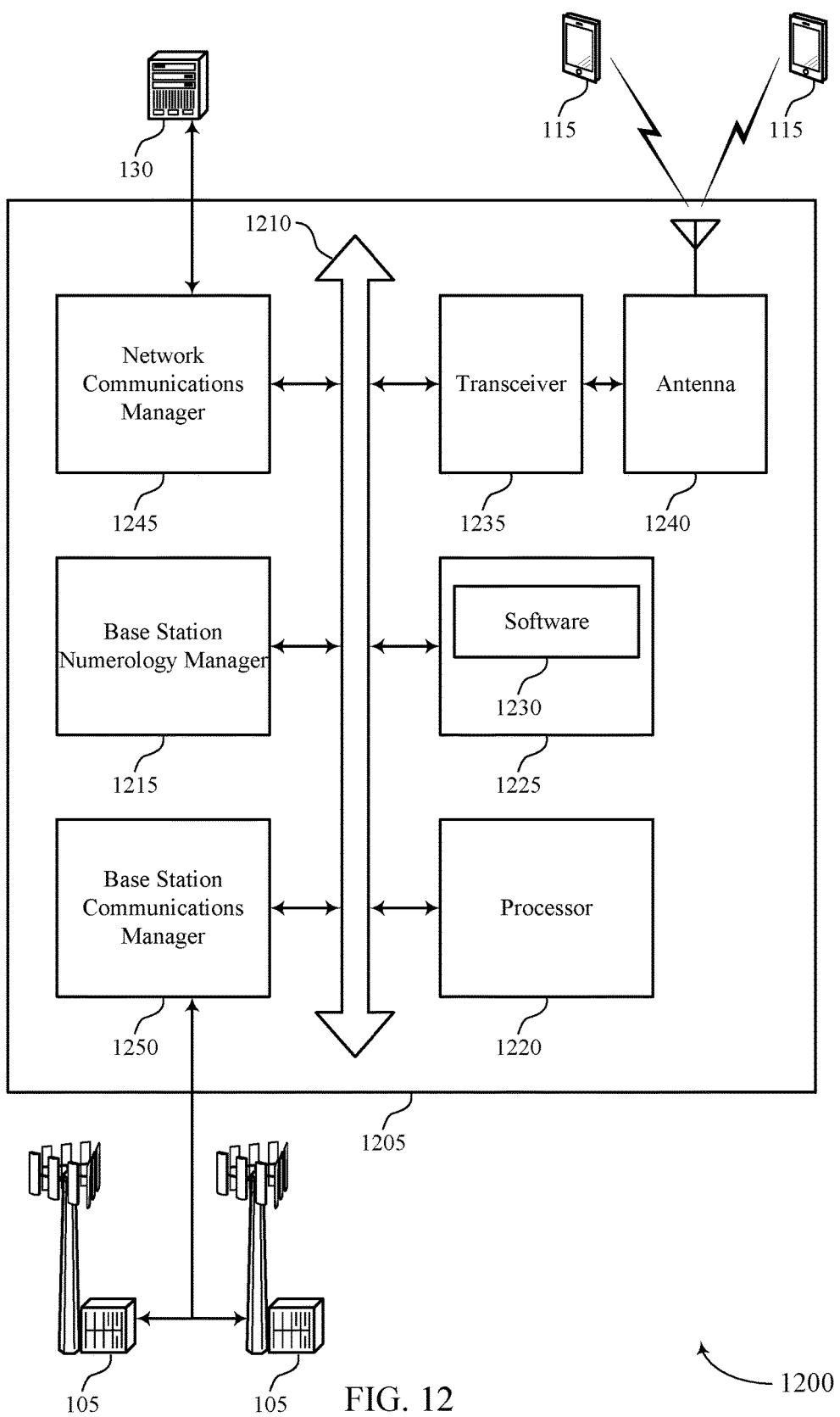
FIG. 12 illustrates a block diagram of a system including a base station that supports synchronization and data channel numerology in wireless communications in accordance with aspects of the present disclosure.

FIG. 12 shows a diagram of a system 1200 including a device 1205 that supports synchronization and data channel numerology in wireless communications in accordance with various aspects of the present disclosure. Device 1205 may be an example of or include the components of device 905, device 1005, or a base station 105 as described above, e.g., with reference to FIGS. 1, 9 and 10. Device 1205 may include components for bi-directional voice and data communications including components for transmitting and receiving communications, including base station numerology manager 1215, processor 1220, memory 1225, software 1230, transceiver 1235, antenna 1240, network communications manager 1245, and base station communications manager 1250. Base station numerology manager 1215 may be an example of network numerology manager 101 or base station numerology manager 201 of FIGS. 1 and 2. These components may be in electronic communication via one or more busses (e.g., bus 1210). Device 1205 may communicate wirelessly with one or more UEs 115.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting synchronization and data channel numerology in wireless communications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support synchronization and data channel numerology in wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an interface within a wireless communication network technology to provide communication between base stations 105.

Figure 13:
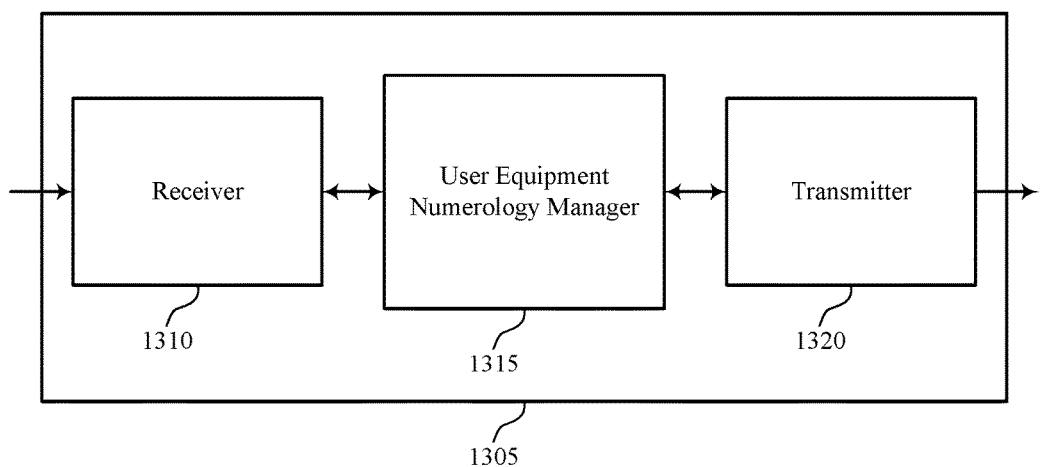
FIGS. 13 through 15 show block diagrams of a device that supports synchronization and data channel numerology in wireless communications in accordance with aspects of the present disclosure.

FIG. 13 shows a block diagram 1300 of a device 1305 that supports synchronization and data channel numerology in wireless communications in accordance with various aspects of the present disclosure. Device 1305 may be an example of aspects of a UE 115 as described with reference to FIGS. 1, 2, and 8. Device 1305 may include receiver 1310, UE numerology manager 1315, and transmitter 1320. Device 1305 may also include a processor. Each of these components may be in communication with one another (e.g., via one or more buses).

Receiver 1310 may receive information such as packets, user data, or control information associated with various information channels (e.g., control channels, data channels, and information related to synchronization and data channel numerology in wireless communications, etc.). Information may be passed on to other components of the device. The receiver 1310 may be an example of aspects of the transceiver 1635 described with reference to FIG. 16.

UE numerology manager 1315 may be an example of aspects of the UE numerology manager 1615 described with reference to FIG. 16. UE numerology manager 1315 may identify a first numerology for receiving data from a base station, identify a second numerology for receiving a synchronization signal from the base station, demodulate and decoding at least a first received downlink transmission in a regular downlink burst based on the first numerology, the first received downlink transmission including at least a portion of the data from the base station, and demodulate and decoding at least a portion of a second received downlink transmission in the regular downlink burst based on the second numerology, the second received downlink transmission including the synchronization signal from the base station.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
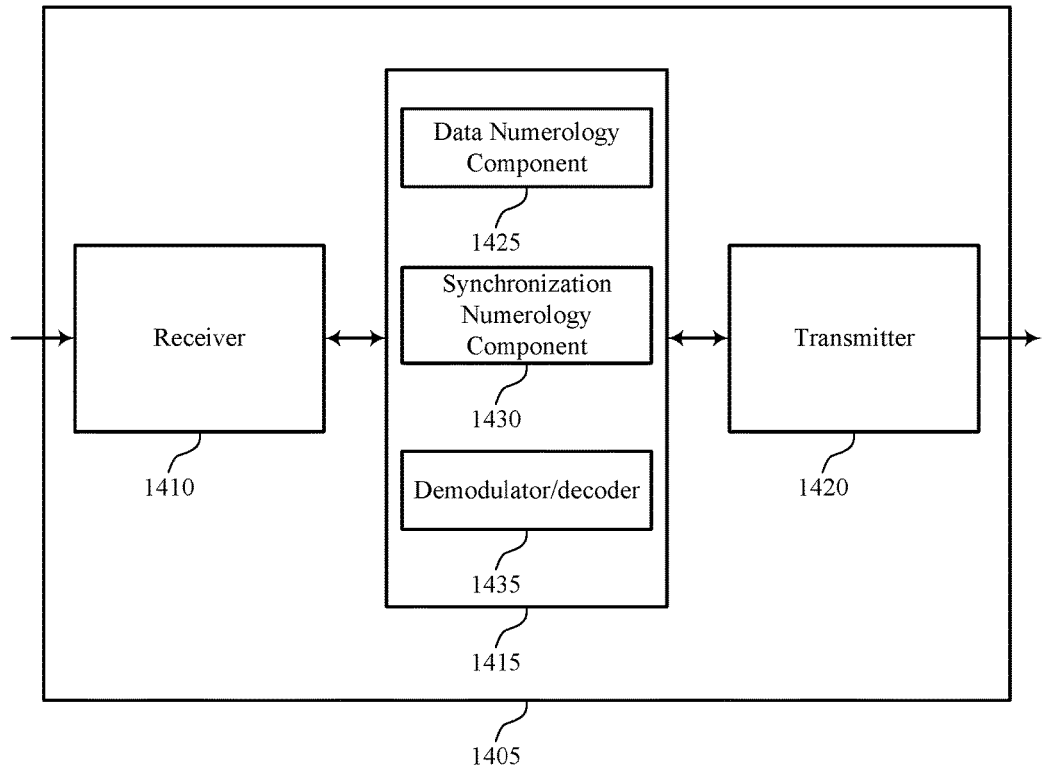

FIG. 14 shows a block diagram 1400 of a device 1405 that supports synchronization and data channel numerology in wireless communications in accordance with various aspects of the present disclosure. Device 1405 may be an example of aspects of a device 1305 or a UE 115 as described with reference to FIGS. 1, 2, 8, and 13. Device 1405 may include receiver 1410, UE numerology manager 1415, and transmitter 1420. Device 1405 may also include a processor. Each of these components may be in communication with one another (e.g., via one or more buses).

Receiver 1410 may receive information such as packets, user data, or control information associated with various information channels (e.g., control channels, data channels, and information related to synchronization and data channel numerology in wireless communications, etc.). Information may be passed on to other components of the device. The receiver 1410 may be an example of aspects of the transceiver 1635 described with reference to FIG. 16.

UE numerology manager 1415 may be an example of aspects of the UE numerology manager 1615 described with reference to FIG. 16. UE numerology manager 1415 may also include data numerology component 1425, synchronization numerology component 1430, and demodulator/decoder 1435.

Data numerology component 1425 may identify a first numerology for receiving data from a base station. Such a first numerology may be identified, for example, based on a service of a data channel. Synchronization numerology component 1430 may identify a second numerology for receiving a synchronization signal from the base station. In some cases, a second received downlink transmission may include at least a PSS, a SSS, or a PBCH transmission, or a combination thereof. In some cases, the first numerology is different from the second numerology. In some cases, the first numerology and the second numerology have a different sub-carrier spacing and cyclic prefix. In some cases, the second numerology is different from a data channel or control channel numerology.

Demodulator/decoder 1435 may demodulate and decode at least a first received downlink transmission in a regular downlink burst based on the first numerology, and demodulate and decode at least a second received downlink transmission in a regular downlink burst based on the second numerology. The first received downlink transmission may include at least a portion of the data from the base station, and the second received downlink transmission may include a PBCH or synchronization signal transmission from the base station. In some cases, the demodulation and decoding each symbol of a downlink burst may be performed based on a numerology associated with the particular symbol.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
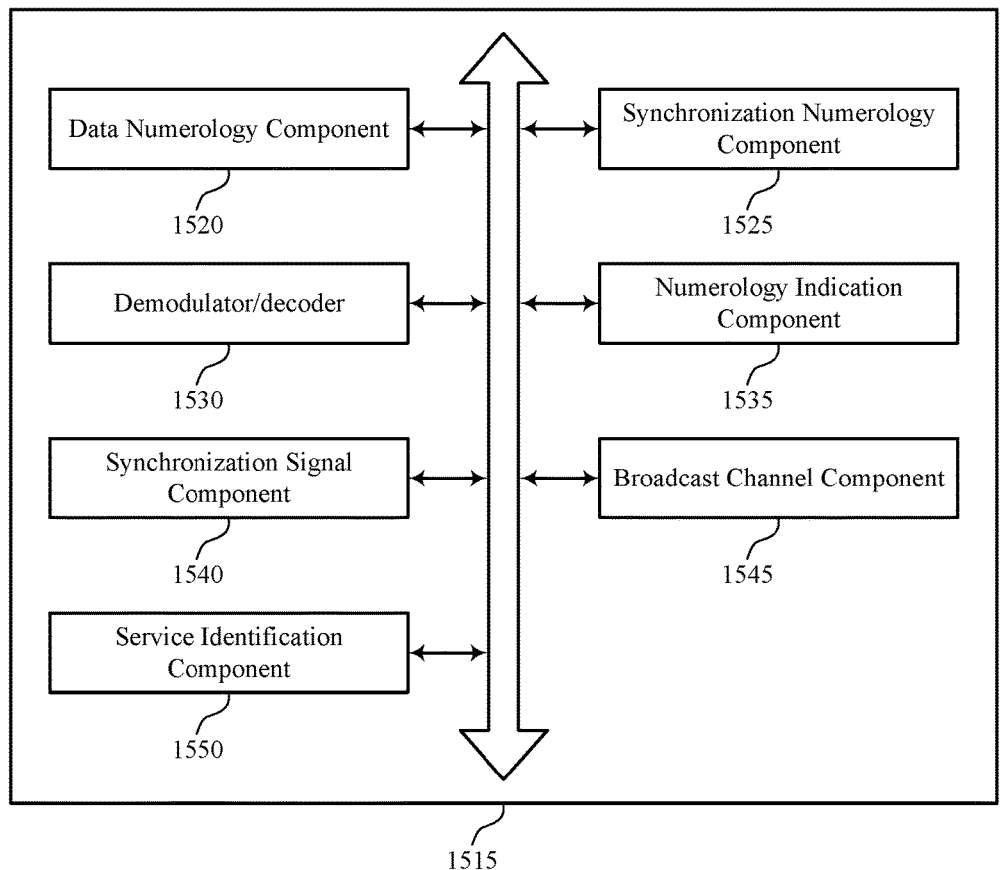

FIG. 15 shows a block diagram 1500 of a UE numerology manager 1515 that supports synchronization and data channel numerology in wireless communications in accordance with various aspects of the present disclosure. The UE numerology manager 1515 may be an example of aspects of a UE numerology manager 1615 described with reference to FIGS. 13, 14, and 16. The UE numerology manager 1515 may include data numerology component 1520, synchronization numerology component 1525, demodulator/decoder 1530, numerology indication component 1535, synchronization signal component 1540, broadcast channel component 1545, and service identification component 1550. Each of these modules may communicate, directly or indirectly, with one another (e.g., via one or more buses).

Data numerology component 1520 may identify a first numerology for receiving data from a base station. Synchronization numerology component 1525 may identify a second numerology for receiving a synchronization signal from the base station. In some cases, the second received downlink transmission includes at least a PSS, or a SSS, or a PBCH transmission, or a combination thereof. In some cases, the first numerology is different from the second numerology. In some cases, the first numerology and the second numerology have a different sub-carrier spacing and cyclic prefix. In some cases, the second numerology is different from a data channel or control channel numerology.

Demodulator/decoder 1530 may demodulate and decode at least a first received downlink transmission in a regular downlink burst based on the first numerology, and demodulate and decode at least a second received downlink transmission in a regular downlink burst based on the second numerology. The first received downlink transmission may include at least a portion of the data from the base station, and the second received downlink transmission may include a PBCH or synchronization signal transmission from the base station. In some cases, the demodulation and decoding each symbol of a downlink burst may be performed based on a numerology associated with the particular symbol.

Numerology indication component 1535 may receive an indication from the base station indicating the first numerology and the second numerology, and where the identifying the first numerology and the identifying the second numerology are based on the indication from the base station. In some cases, the indication is transmitted in one or more of a master information block (MIB), a minimum system information block (MSIB), MSI, RMSI, OSI, DCI, or a physical broadcast channel transmission received from the base station.

Synchronization signal component 1540 may identify a first subset of a set of symbols of the second received downlink transmission for receiving the synchronization signal and identify a second subset of the set of symbols of the second received downlink transmission for receiving at least a portion of the data. Broadcast channel component 1545 may identify a second subset of the set of downlink symbols for receiving a broadcast channel transmission. Service identification component 1550 may help determine the first numerology based on a service that is associated with the first received downlink transmission and the second received downlink transmission.

Figure 16:
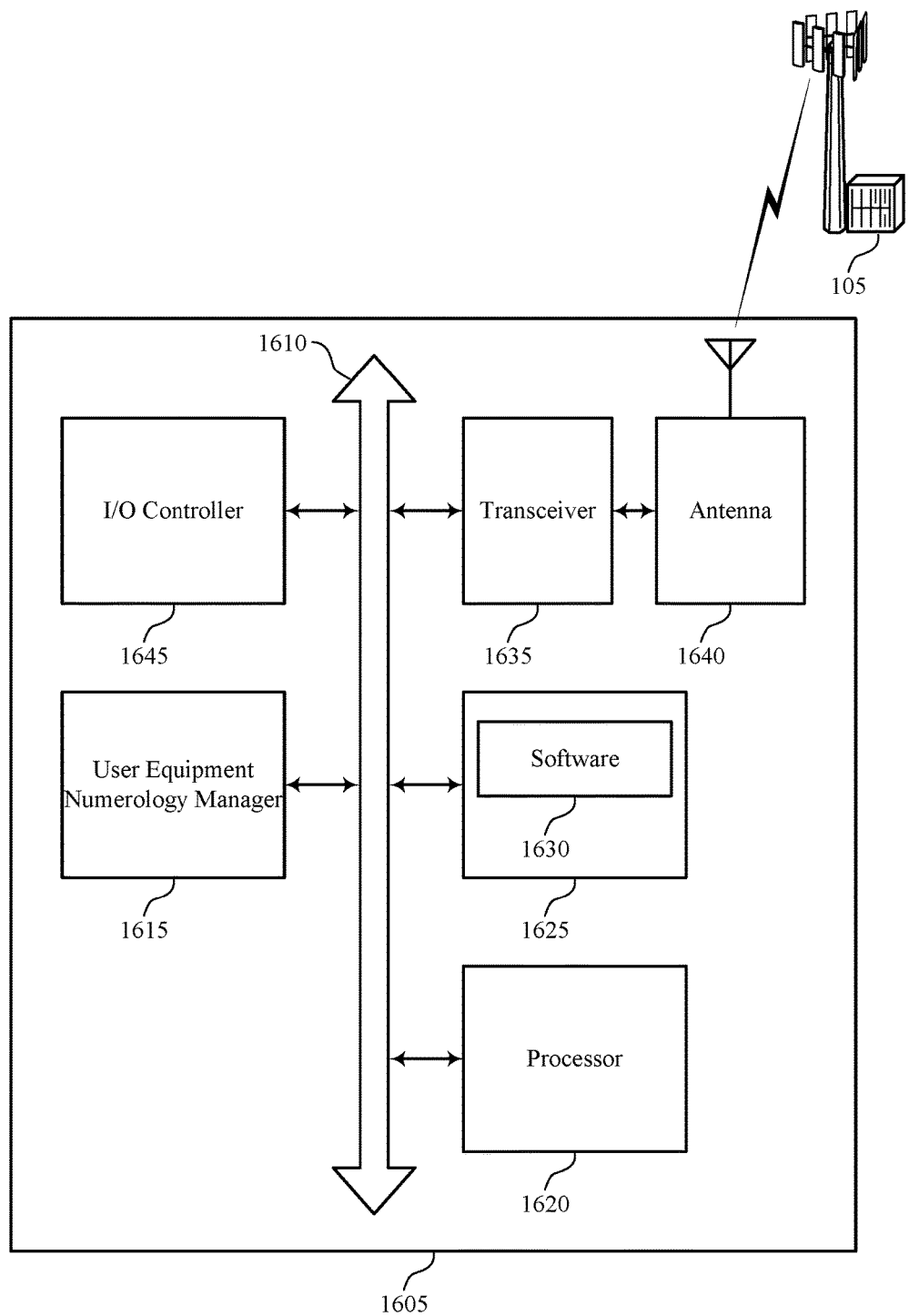
FIG. 16 illustrates a block diagram of a system including a UE that supports synchronization and data channel numerology in wireless communications in accordance with aspects of the present disclosure.

FIG. 16 shows a diagram of a system 1600 including a device 1605 that supports synchronization and data channel numerology in wireless communications in accordance with various aspects of the present disclosure. Device 1605 may be an example of or include the components of UE 115 as described above, e.g., with reference to FIGS. 1, 2, and 8. Device 1605 may include components for bi-directional voice and data communications including components for transmitting and receiving communications, including UE numerology manager 1615, processor 1620, memory 1625, software 1630, transceiver 1635, antenna 1640, and I/O controller 1645. UE numerology manager 1615 may be an example of a UE numerology manager 102 or a UE numerology manager 202 of FIGS. 1 and 2. These components may be in electronic communication via one or more busses (e.g., bus 1610). Device 1605 may communicate wirelessly with one or more base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting synchronization and data channel numerology in wireless communications).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support synchronization and data channel numerology in wireless communications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system.

Figure 17:
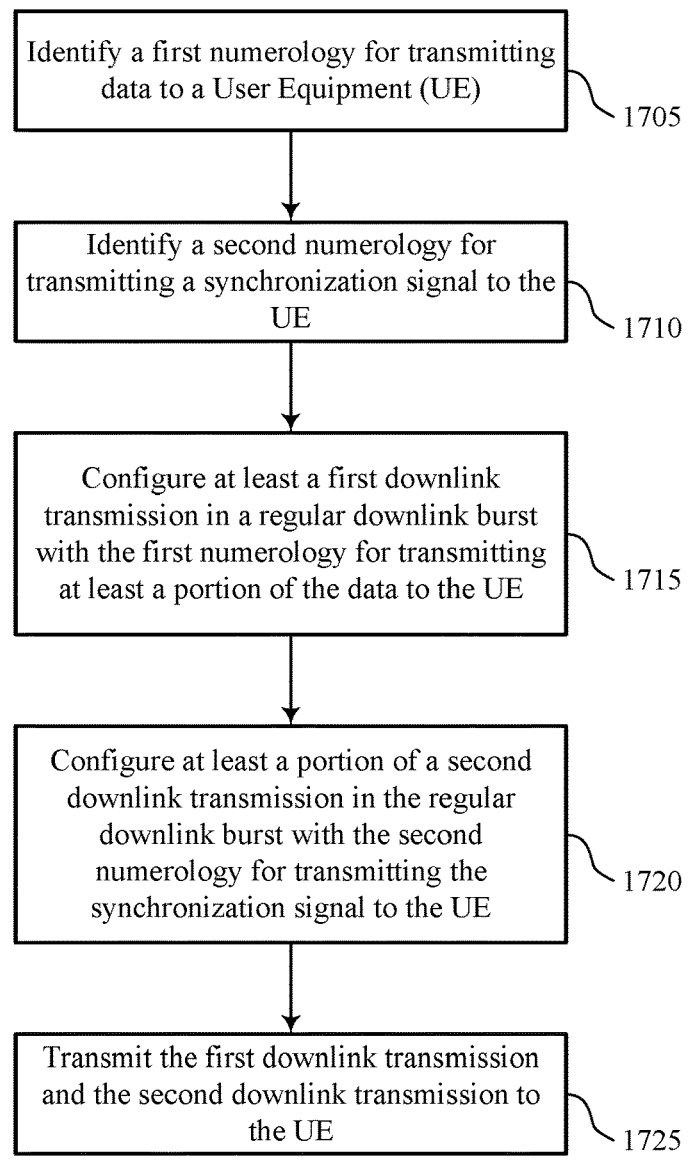
FIGS. 17 through 22 illustrate methods for synchronization and data channel numerology in wireless communications in accordance with aspects of the present disclosure.

FIG. 17 shows a flowchart illustrating a method 1700 for synchronization and data channel numerology in wireless communications in accordance with various aspects of the present disclosure. The operations of method 1700 may be implemented by a base station 105 or its components as described herein. For example, the operations of method 1700 may be performed by a base station numerology manager as described with reference to FIGS. 9 through 12. In some examples, a base station 105 may execute a set of codes to control the functional elements of the device to perform the functions described below. Additionally or alternatively, the base station 105 may perform aspects the functions described below using special-purpose hardware.

At 1705 the base station 105 may identify a first numerology for transmitting data to a UE. The operations of 1705 may be performed according to the methods described with reference to FIGS. 1 through 8. In certain examples, aspects of the operations of 1705 may be performed by a data numerology component as described with reference to FIGS. 9 through 12.

At 1710 the base station 105 may identify a second numerology for transmitting a synchronization signal to the UE. The operations of 1710 may be performed according to the methods described with reference to FIGS. 1 through 8. In certain examples, aspects of the operations of 1710 may be performed by a synchronization numerology component as described with reference to FIGS. 9 through 12.

At 1715 the base station 105 may configure at least a first downlink transmission in a regular downlink burst with the first numerology for transmitting at least a portion of the data to the UE. The operations of 1715 may be performed according to the methods described with reference to FIGS. 1 through 8. In certain examples, aspects of the operations of 1715 may be performed by a scheduler as described with reference to FIGS. 9 through 12.

At 1720 the base station 105 may configure at least a portion of a second downlink transmission in the regular downlink burst with the second numerology for transmitting the synchronization signal to the UE. The operations of 1720 may be performed according to the methods described with reference to FIGS. 1 through 8. In certain examples, aspects of the operations of 1720 may be performed by a scheduler as described with reference to FIGS. 9 through 12.

At 1725 the base station 105 may transmit the first downlink transmission and the second downlink transmission to the UE. The operations of 1725 may be performed according to the methods described with reference to FIGS. 1 through 8. In certain examples, aspects of the operations of 1725 may be performed by a transmitter as described with reference to FIGS. 9 through 12.

Figure 18:
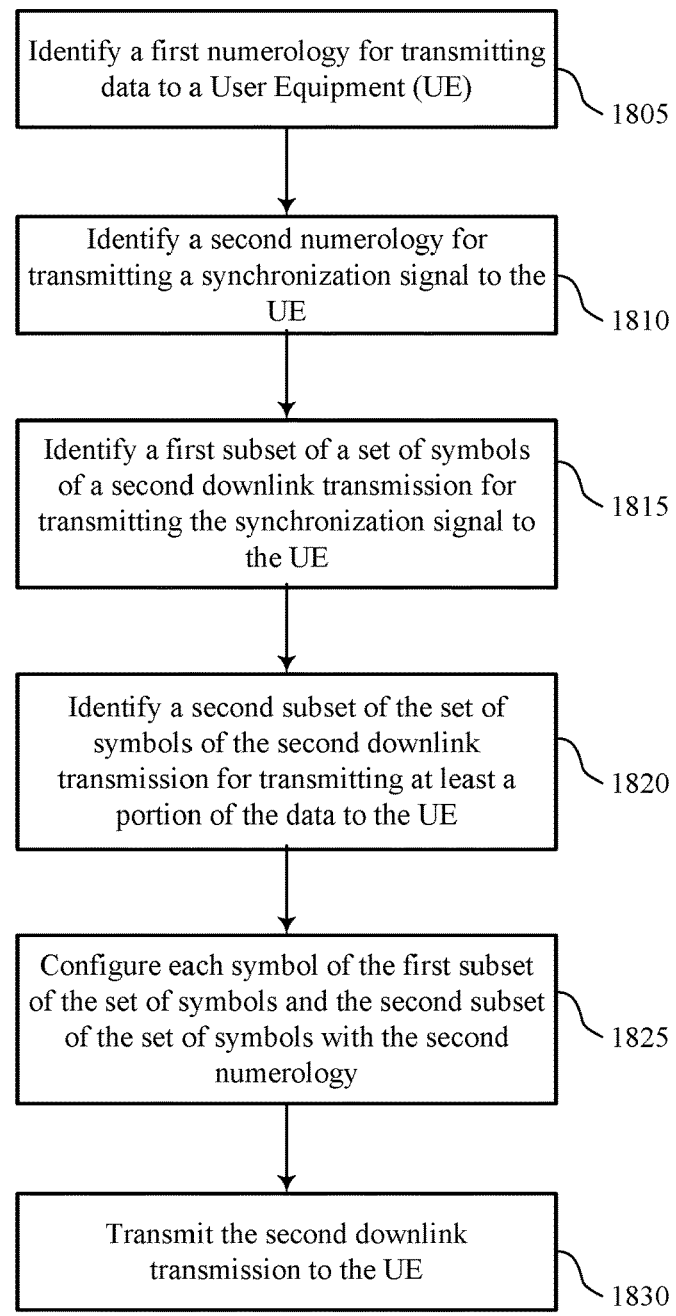

FIG. 18 shows a flowchart illustrating a method 1800 for synchronization and data channel numerology in wireless communications in accordance with various aspects of the present disclosure. The operations of method 1800 may be implemented by a base station 105 or its components as described herein. For example, the operations of method 1800 may be performed by a base station numerology manager as described with reference to FIGS. 9 through 12. In some examples, a base station 105 may execute a set of codes to control the functional elements of the device to perform the functions described below. Additionally or alternatively, the base station 105 may perform aspects the functions described below using special-purpose hardware.

At 1805 the base station 105 may identify a first numerology for transmitting data to a UE. The operations of 1805 may be performed according to the methods described with reference to FIGS. 1 through 8. In certain examples, aspects of the operations of 1805 may be performed by a data numerology component as described with reference to FIGS. 9 through 12.

At 1810 the base station 105 may identify a second numerology for transmitting a synchronization signal to the UE. The operations of 1810 may be performed according to the methods described with reference to FIGS. 1 through 8. In certain examples, aspects of the operations of 1810 may be performed by a synchronization numerology component as described with reference to FIGS. 9 through 12.

At 1815 the base station 105 may identify a first subset of a set of symbols of a second downlink transmission for transmitting the synchronization signal to the UE. The operations of 1815 may be performed according to the methods described with reference to FIGS. 1 through 8. In certain examples, aspects of the operations of 1815 may be performed by a synchronization signal component as described with reference to FIGS. 9 through 12.

At 1820 the base station 105 may identify a second subset of the set of symbols of the second downlink transmission for transmitting at least a portion of the data to the UE. The operations of 1820 may be performed according to the methods described with reference to FIGS. 1 through 8. In certain examples, aspects of the operations of 1820 may be performed by a synchronization signal component as described with reference to FIGS. 9 through 12.

At 1825 the base station 105 may configure each symbol of the first subset of the set of symbols and the second subset of the set of symbols with the second numerology. The operations of 1825 may be performed according to the methods described with reference to FIGS. 1 through 8. In certain examples, aspects of the operations of 1825 may be performed by a scheduler as described with reference to FIGS. 9 through 12.

At 1830 the base station 105 may transmit the first downlink transmission and the second downlink transmission to the UE. The operations of 1830 may be performed according to the methods described with reference to FIGS. 1 through 8. In certain examples, aspects of the operations of 1830 may be performed by a transmitter as described with reference to FIGS. 9 through 12.

Figure 19:
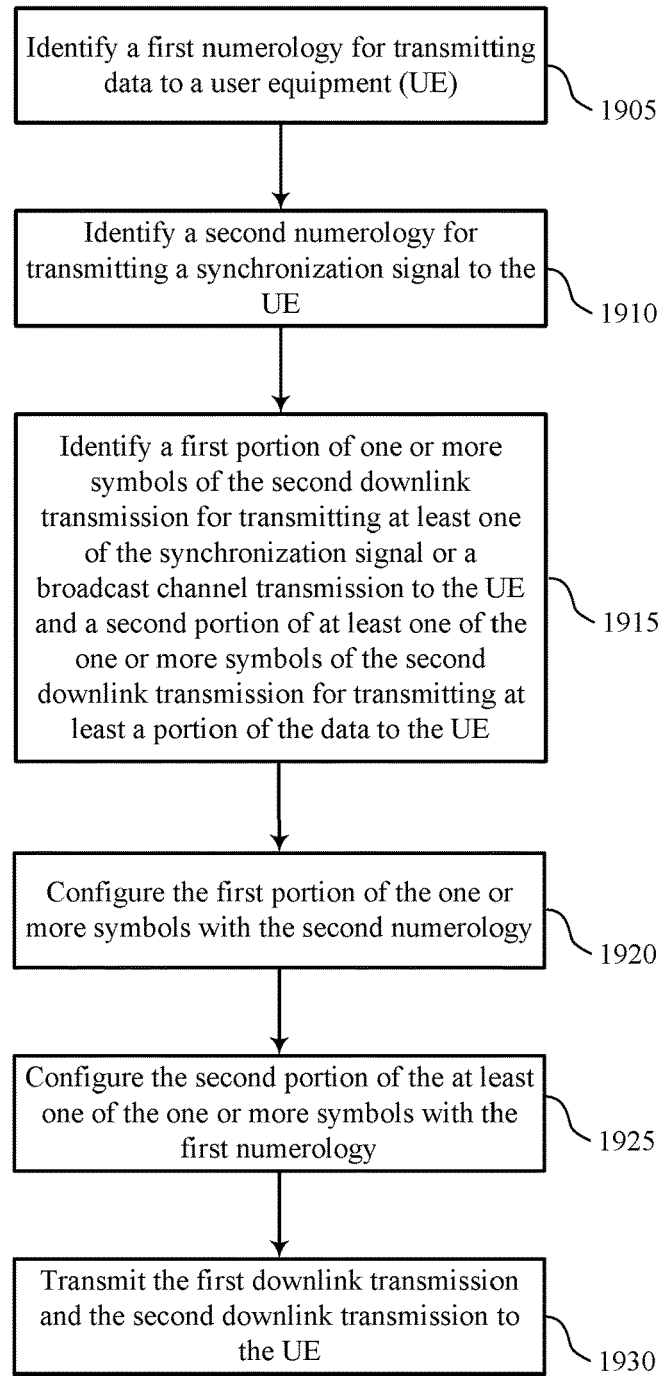

FIG. 19 shows a flowchart illustrating a method 1900 for synchronization and data channel numerology in wireless communications in accordance with various aspects of the present disclosure. The operations of method 1900 may be implemented by a base station 105 or its components as described herein. For example, the operations of method 1900 may be performed by a base station numerology manager as described with reference to FIGS. 9 through 12. In some examples, a base station 105 may execute a set of codes to control the functional elements of the device to perform the functions described below. Additionally or alternatively, the base station 105 may perform aspects the functions described below using special-purpose hardware.

At 1905 the base station 105 may identify a first numerology for transmitting data to a UE. The operations of 1905 may be performed according to the methods described with reference to FIGS. 1 through 8. In certain examples, aspects of the operations of 1905 may be performed by a data numerology component as described with reference to FIGS. 9 through 12.

At 1910 the base station 105 may identify a second numerology for transmitting a synchronization signal to the UE. The operations of 1910 may be performed according to the methods described with reference to FIGS. 1 through 8. In certain examples, aspects of the operations of 1910 may be performed by a synchronization numerology component as described with reference to FIGS. 9 through 12.

At 1915 the base station 105 may identify a first portion of one or more symbols of the second downlink transmission for transmitting at least one of the synchronization signal or a broadcast channel transmission to the UE, and identify a second portion of at least one of the one or more symbols of the second downlink transmission for transmitting at least a portion of the data to the UE. The operations of 1915 may be performed according to the methods described with reference to FIGS. 1 through 8. In certain examples, aspects of the operations of 1935 may be performed by a synchronization signal component as described with reference to FIGS. 9 through 12.

At 1920 the base station 105 may Configure the first portion of the one or more symbols with the second numerology. The operations of 1920 may be performed according to the methods described with reference to FIGS. 1 through 8. In certain examples, aspects of the operations of 1920 may be performed by a scheduler as described with reference to FIGS. 9 through 12.

At 1925 the base station 105 may configure the second portion of the at least one of the one or more symbols with the first numerology. The operations of 1925 may be performed according to the methods described with reference to FIGS. 1 through 8. In certain examples, aspects of the operations of 1925 may be performed by a scheduler as described with reference to FIGS. 9 through 12.

At 1930 the base station 105 may transmit the first downlink transmission and the second downlink transmission to the UE. The operations of 1930 may be performed according to the methods described with reference to FIGS. 1 through 8. In certain examples, aspects of the operations of 1930 may be performed by a transmitter as described with reference to FIGS. 9 through 12.

Figure 20:
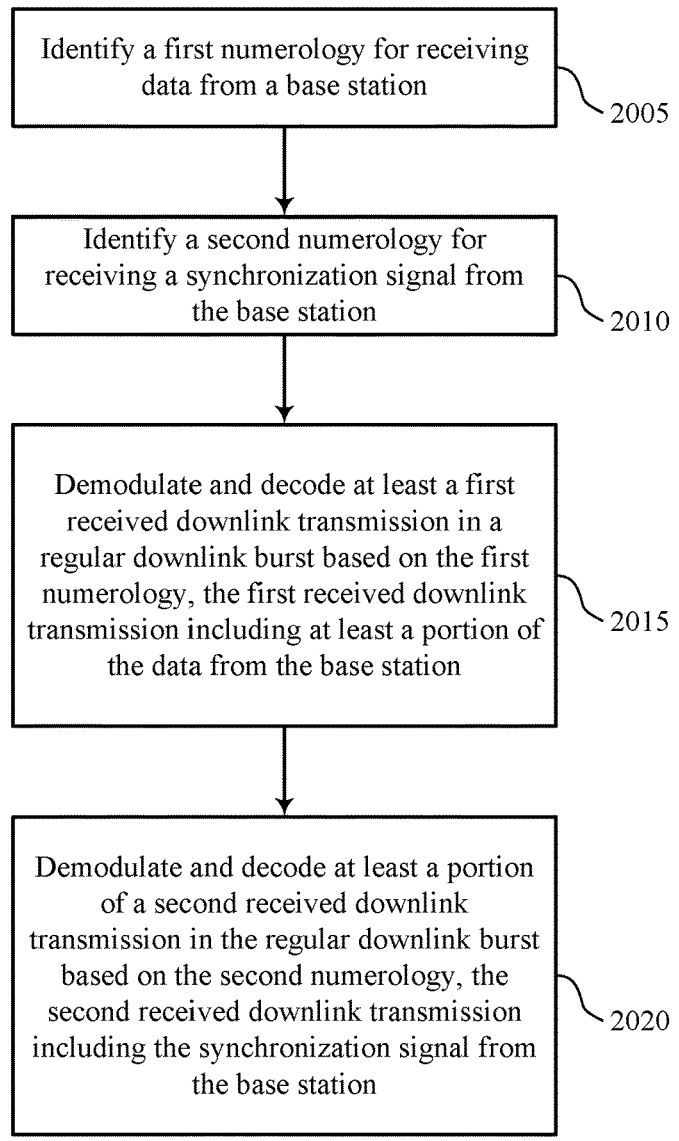

FIG. 20 shows a flowchart illustrating a method 2000 for synchronization and data channel numerology in wireless communications in accordance with various aspects of the present disclosure. The operations of method 2000 may be implemented by a UE 115 or its components as described herein. For example, the operations of method 2000 may be performed by a UE numerology manager as described with reference to FIGS. 13 through 16. In some examples, a UE 115 may execute a set of codes to control the functional elements of the device to perform the functions described below. Additionally or alternatively, the UE 115 may perform aspects the functions described below using special-purpose hardware.

At 2005 the UE 115 may identify a first numerology for receiving data from a base station. The operations of 2005 may be performed according to the methods described with reference to FIGS. 1 through 8. In certain examples, aspects of the operations of 2005 may be performed by a data numerology component as described with reference to FIGS. 13 through 16.

At 2010 the UE 115 may identify a second numerology for receiving a synchronization signal from the base station. The operations of 2010 may be performed according to the methods described with reference to FIGS. 1 through 8. In certain examples, aspects of the operations of 2010 may be performed by a synchronization numerology component as described with reference to FIGS. 13 through 16.

At 2015 the UE 115 may demodulate and decode at least a first received downlink transmission in a regular downlink burst based at least in part on the first numerology, the first received downlink transmission including at least a portion of the data from the base station. The operations of 2015 may be performed according to the methods described with reference to FIGS. 1 through 8. In certain examples, aspects of the operations of 2015 may be performed by a demodulator/decoder as described with reference to FIGS. 13 through 16.

At 2020 the UE 115 may demodulate and decode at least a portion of a second received downlink transmission in the regular downlink burst based at least in part on the second numerology, the second received downlink transmission including the synchronization signal from the base station. The operations of 2020 may be performed according to the methods described with reference to FIGS. 1 through 8. In certain examples, aspects of the operations of 2020 may be performed by a demodulator/decoder as described with reference to FIGS. 13 through 16.

Figure 21:
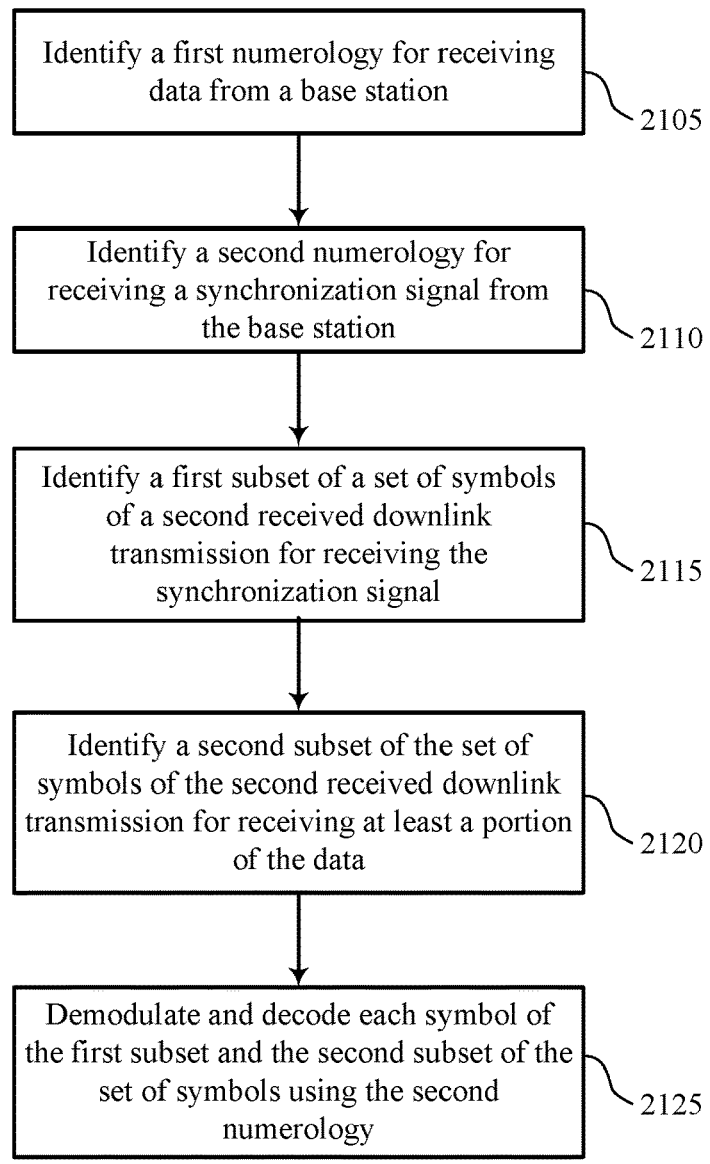

FIG. 21 shows a flowchart illustrating a method 2100 for synchronization and data channel numerology in wireless communications in accordance with various aspects of the present disclosure. The operations of method 2100 may be implemented by a UE 115 or its components as described herein. For example, the operations of method 2100 may be performed by a UE numerology manager as described with reference to FIGS. 13 through 16. In some examples, a UE 115 may execute a set of codes to control the functional elements of the device to perform the functions described below. Additionally or alternatively, the UE 115 may perform aspects the functions described below using special-purpose hardware.

At 2105 the UE 115 may identify a first numerology for receiving data from a base station. The operations of 2105 may be performed according to the methods described with reference to FIGS. 1 through 8. In certain examples, aspects of the operations of 2105 may be performed by a data numerology component as described with reference to FIGS. 13 through 16.

At 2110 the UE 115 may identify a second numerology for receiving a synchronization signal from the base station. The operations of 2110 may be performed according to the methods described with reference to FIGS. 1 through 8. In certain examples, aspects of the operations of 2110 may be performed by a synchronization numerology component as described with reference to FIGS. 13 through 16.

At 2115 the UE 115 may identify a first subset of a set of symbols of the second received downlink transmission for receiving the synchronization signal. The operations of 2115 may be performed according to the methods described with reference to FIGS. 1 through 8. In certain examples, aspects of the operations of 2115 may be performed by a synchronization signal component as described with reference to FIGS. 13 through 16.

At 2120 the UE 115 may identify a second subset of the set of symbols of the second received downlink transmission for receiving at least a portion of the data. The operations of 2120 may be performed according to the methods described with reference to FIGS. 1 through 8. In certain examples, aspects of the operations of 2120 may be performed by a synchronization signal component as described with reference to FIGS. 13 through 16.

At 2125 the UE 115 may demodulate and decode each symbol of the first subset and the second subset of the set of symbols using the second numerology. The operations of 2125 may be performed according to the methods described with reference to FIGS. 1 through 8. In certain examples, aspects of the operations of 2125 may be performed by a demodulator/decoder as described with reference to FIGS. 13 through 16.

Figure 22:
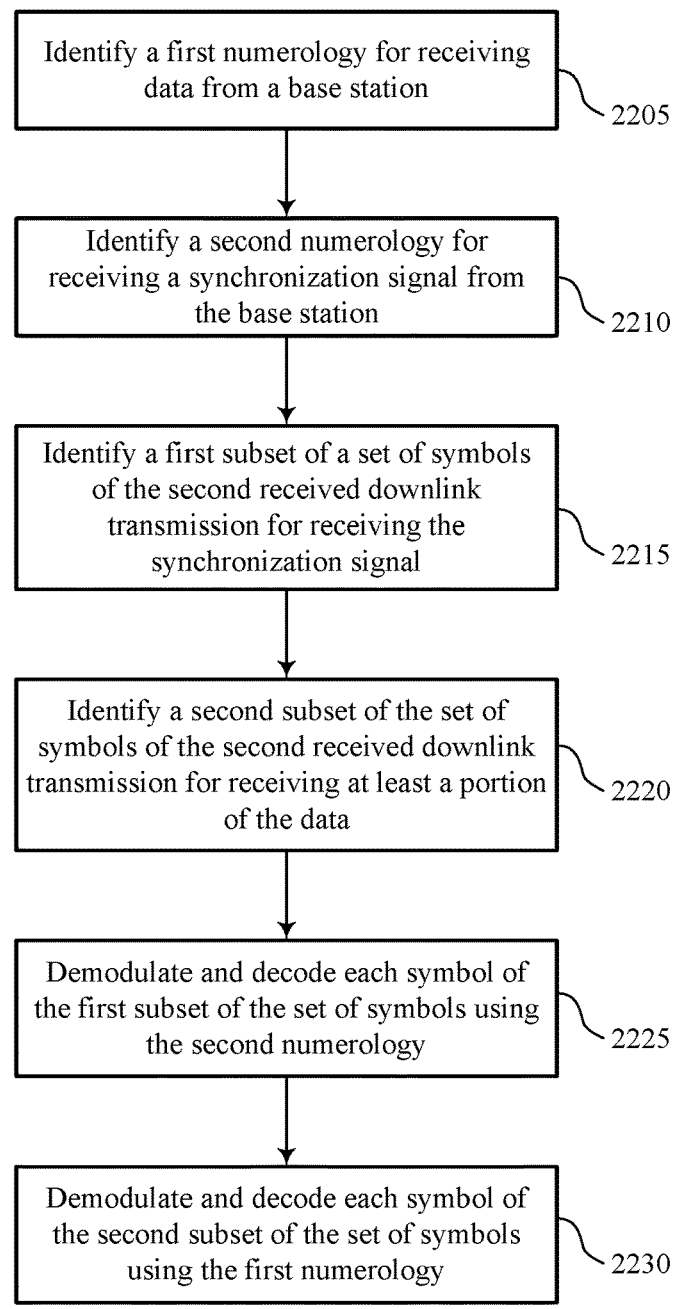

FIG. 22 shows a flowchart illustrating a method 2200 for synchronization and data channel numerology in wireless communications in accordance with various aspects of the present disclosure. The operations of method 2200 may be implemented by a UE 115 or its components as described herein. For example, the operations of method 2200 may be performed by a UE numerology manager as described with reference to FIGS. 13 through 16. In some examples, a UE 115 may execute a set of codes to control the functional elements of the device to perform the functions described below. Additionally or alternatively, the UE 115 may perform aspects the functions described below using special-purpose hardware.

At 2205 the UE 115 may identify a first numerology for receiving data from a base station. The operations of 2205 may be performed according to the methods described with reference to FIGS. 1 through 8. In certain examples, aspects of the operations of 2205 may be performed by a data numerology component as described with reference to FIGS. 13 through 16.

At 2210 the UE 115 may identify a second numerology for receiving a synchronization signal from the base station. The operations of 2210 may be performed according to the methods described with reference to FIGS. 1 through 8. In certain examples, aspects of the operations of 2210 may be performed by a synchronization numerology component as described with reference to FIGS. 13 through 16.

At 2215 the UE 115 may identify a first subset of a set of symbols of the second received downlink transmission for receiving the synchronization signal. The operations of 2215 may be performed according to the methods described with reference to FIGS. 1 through 8. In certain examples, aspects of the operations of 2215 may be performed by a synchronization signal component as described with reference to FIGS. 13 through 16.

At 2220 the UE 115 may identify a second subset of the set of symbols of the second received downlink transmission for receiving at least a portion of the data. The operations of 2220 may be performed according to the methods described with reference to FIGS. 1 through 8. In certain examples, aspects of the operations of 2220 may be performed by a synchronization signal component as described with reference to FIGS. 13 through 16.

At 2225 the UE 115 may demodulate and decode each symbol of the first subset of the set of symbols using the second numerology. The operations of 2225 may be performed according to the methods described with reference to FIGS. 1 through 8. In certain examples, aspects of the operations of 2225 may be performed by a demodulator/decoder as described with reference to FIGS. 13 through 16.

At 2230 the UE 115 may demodulate and decode each symbol of the second subset of the set of symbols using the first numerology. The operations of 2230 may be performed according to the methods described with reference to FIGS. 1 through 8. In certain examples, aspects of the operations of 2230 may be performed by a demodulator/decoder as described with reference to FIGS. 13 through 16.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first numerology for transmitting data to a user equipment (UE);
   identifying a second numerology for transmitting a synchronization signal to the UE;
   configuring at least a first downlink transmission in a regular downlink burst with the first numerology for transmitting at least a portion of the data to the UE;
   configuring a portion of a second downlink transmission in the regular downlink burst with the second numerology for transmitting the synchronization signal to the UE and a second portion of the second downlink transmission with the first numerology for transmitting a second portion of the data to the UE, wherein the portion and the second portion at least partially overlap in time; and
   transmitting the first downlink transmission and the second downlink transmission to the UE.

2. The method of claim 1, wherein the second downlink transmission includes at least a primary synchronization signal (PSS), or a secondary synchronization signal (SSS), or a physical broadcast channel (PBCH) transmission, or a combination thereof.

3. The method of claim 1, wherein configuring the second downlink transmission comprises:
   identifying a first portion of at least one symbol of the second downlink transmission for transmitting at least one of the synchronization signal or a broadcast channel transmission to the UE;
   identifying a second portion of the at least one symbol of the second downlink transmission for transmitting at least a portion of the second portion of the data to the UE;
   configuring the first portion of the at least one symbol with the second numerology; and
   configuring the second portion of the at least one symbol with the first numerology.

4. The method of claim 1, wherein configuring the second downlink transmission comprises:
   identifying a first subset of a set of symbols of the second downlink transmission for transmitting the synchronization signal to the UE;
   identifying a second subset of the set of symbols of the second downlink transmission for transmitting at least a portion of the data to the UE; and
   configuring each symbol of the first subset of the set of symbols and the second subset of the set of symbols with the second numerology.

5. The method of claim 1, wherein the second downlink transmission comprises a set of downlink symbols and a first subset of the set of downlink symbols is used for transmitting the synchronization signal, and wherein the method further comprises:
   identifying a second subset of the set of downlink symbols for transmitting a broadcast channel transmission;
   configuring the first subset of the set of downlink symbols with the second numerology; and
   configuring the second subset of the set of downlink symbols with the first numerology.

6. The method of claim 1, wherein the second downlink transmission comprises a set of downlink symbols and a first subset of the set of downlink symbols is used for transmitting the synchronization signal, and wherein the method further comprises:

identifying a second subset of the set of downlink symbols for transmitting a broadcast channel transmission; and configuring the first subset of the set of downlink symbols and the second subset of the set of downlink symbols with the second numerology.

7. The method of claim 1, further comprising:
transmitting an indication to the UE to indicate the first numerology, the second numerology, or combinations thereof, are to be used in the second downlink transmission.

8. The method of claim 7, wherein the indication is transmitted in at least one of minimum system information (MSI), downlink control information (DCI), or a physical broadcast channel transmission transmitted to the UE.

9. The method of claim 1, further comprising:
identifying a UE category for the UE, the UE category identifying whether the UE is able to process multiple numerologies within a symbol;
scheduling a transmission of the data to the UE based at least in part on the UE category of the UE and whether a downlink transmission includes the synchronization signal.

10. The method of claim 9, wherein transmission of the data to the UE is unscheduled in a resource block (RB) or a symbol of the second downlink transmission that includes the synchronization signal.

11. The method of claim 9, wherein a first portion of the data to be transmitted to the UE is scheduled in a RB or symbol of the second downlink transmission that includes the synchronization signal, and wherein the first portion of the data is configured for transmission using the second numerology.

12. The method of claim 1, wherein the first numerology is different from the second numerology.

13. The method of claim 12, wherein at least one of the first numerology and the second numerology have a different sub-carrier spacing and cyclic prefix, the first numerology is determined based at least in part on a service that is associated with the first downlink transmission and the second downlink transmission, or the second numerology is different from a data channel or control channel numerology.

14. A method for wireless communication, comprising:
identifying a first numerology for receiving data from a base station;
identifying a second numerology for receiving a synchronization signal from the base station;
demodulating and decoding at least a first received downlink transmission in a regular downlink burst based at least in part on the first numerology, the first received downlink transmission including at least a portion of the data from the base station;
demodulating and decoding at least a portion of a second received downlink transmission in the regular downlink burst based at least in part on the second numerology, the portion including the synchronization signal from the base station; and
demodulating and decoding a second portion of the second received downlink transmission in the regular downlink burst based at least in part on the first numerology, the second portion including a second portion of the data from the base station, wherein the portion and the second portion at least partially overlap in time.

15. The method of claim 14, wherein the second received downlink transmission includes at least a primary synchronization signal (PSS), or a secondary synchronization signal (SSS), or a physical broadcast channel (PBCH) transmission, or a combination thereof.

16. The method of claim 14, further comprising:
receiving an indication from the base station indicating the first numerology and the second numerology, and wherein the identifying the first numerology and the identifying the second numerology are based at least in part on the indication from the base station.

17. The method of claim 16, wherein the indication is transmitted in one or more of minimum system information (MSI), downlink control information (DCI), or a physical broadcast channel transmission received from the base station.

18. The method of claim 14, wherein the demodulating and decoding the second received downlink transmission comprises:
identifying a first portion of at least one symbol of the second downlink transmission for receiving at least one of the synchronization signal or a broadcast channel transmission;
identifying a second portion of the at least one symbol of the second downlink transmission for receiving at least a portion of the second portion of the data;
demodulating and decoding the first portion of the at least one symbol with the second numerology; and
demodulating and decoding the second portion of the at least one symbol with the first numerology.

19. The method of claim 14, wherein the demodulating and decoding of the second received downlink transmission comprises:
identifying a first subset of a set of symbols of the second received downlink transmission for receiving the synchronization signal;
identifying a second subset of the set of symbols of the second received downlink transmission for receiving at least a portion of the data; and
demodulating and decoding each symbol of the first subset and the second subset of the set of symbols using the second numerology.

20. The method of claim 14, wherein the second received downlink transmission comprises a set of downlink symbols and a first subset of the set of downlink symbols includes the synchronization signal, and wherein the method further comprises:
identifying a second subset of the set of downlink symbols for receiving a broadcast channel transmission;
demodulating and decoding the first subset of the set of downlink symbols using the second numerology; and
demodulating and decoding the second subset of the set of downlink symbols using the first numerology.

21. The method of claim 14, wherein the second received downlink transmission comprises a set of downlink symbols and a first subset of the set of downlink symbols includes the synchronization signal, and wherein the method further comprises:
identifying a second subset of the set of downlink symbols for receiving a broadcast channel transmission; and
demodulating and decoding the first subset of the set of downlink symbols and the second subset of the set of downlink symbols using the second numerology.

22. The method of claim 14, wherein at least one of the first numerology and the second numerology have a different sub-carrier spacing and cyclic prefix or the first numerology is determined based at least in part on a service that is associated with the first received downlink transmission and the second received downlink transmission.

23. An apparatus for wireless communication, comprising:
a processor;
memory in electronic communication with the processor; and
the processor and memory configured to:
identify a first numerology for transmitting data to a user equipment (UE);
identify a second numerology for transmitting a synchronization signal to the UE;
configure at least a first downlink transmission in a regular downlink burst with the first numerology for transmitting at least a portion of the data to the UE;
configure a portion of a second downlink transmission in the regular downlink burst with the second numerology for transmitting the synchronization signal to the UE and a second portion of the second downlink transmission with the first numerology for transmitting a second portion of the data to the UE with the first and second portions of the second downlink transmission at least partially overlapping in time; and
transmit the first downlink transmission and the second downlink transmission to the UE.

24. The apparatus of claim 23, wherein the processor and memory are further configured to:
identify a first portion of at least one symbol of the second downlink transmission for transmitting at least one of the synchronization signal or a broadcast channel transmission to the UE;
identify a second portion of the at least one symbol of the second downlink transmission for transmitting at least a portion of the second portion of the data to the UE;
configure the first portion of the at least one symbol with the second numerology; and
configure the second portion of the at least one symbol with the first numerology.

25. The apparatus of claim 23, wherein the processor and memory are further configured to:
identify a first subset of a set of symbols of the second downlink transmission for transmitting the synchronization signal to the UE;
identify a second subset of the set of symbols of the second downlink transmission for transmitting at least a portion of the data to the UE; and
configure each symbol of the first subset of the set of symbols and the second subset of the set of symbols with the second numerology.

26. An apparatus for wireless communication, comprising:
a processor;
memory in electronic communication with the processor; and
the processor and memory configured to:
identify a first numerology for receiving data from a base station;
identify a second numerology for receiving a synchronization signal from the base station;
demodulate and decode at least a first received downlink transmission in a regular downlink burst based at least in part on the first numerology, the first received downlink transmission including at least a portion of the data from the base station;
demodulate and decode at least a portion of a second received downlink transmission in the regular downlink burst based at least in part on the second numerology, the portion including the synchronization signal from the base station; and
demodulate and decode a second portion of the second received downlink transmission in the regular downlink burst based at least in part on the first numerology, the second portion including a second portion of the data from the base station, wherein the portion and the second portion at least partially overlap in time.

27. The apparatus of claim 26, wherein the processor and memory are further configured to:
identify a first portion of at least one symbol of the second downlink transmission for receiving at least one of the synchronization signal or a broadcast channel transmission;
identify a second portion of the at least one symbol of the second downlink transmission for receiving at least a portion of the second portion of the data;
demodulate and decode the first portion of the at least one symbol with the second numerology; and
demodulate and decode the second portion of the at least one symbol with the first numerology.

28. The apparatus of claim 26, wherein the processor and memory are further configured to:
identify a first subset of a set of symbols of the second received downlink transmission for receiving the synchronization signal;
identify a second subset of the set of symbols of the second received downlink transmission for receiving at least a portion of the data; and
demodulate and decode each symbol of the first subset and the second subset of the set of symbols using the second numerology.

29. The method of claim 14, further comprising:
identifying a UE category for the UE, the UE category identifying whether the UE is able to process multiple numerologies within a symbol;
scheduling a transmission of the data to the UE based at least in part on the UE category of the UE and whether a downlink transmission includes the synchronization signal.

30. The method of claim 29, wherein a first portion of the data to be transmitted to the UE is scheduled in a RB or symbol of the second downlink transmission that includes the synchronization signal, and wherein the first portion of the data is configured for transmission using the second numerology.

* * * * *